(12) United States Patent
Schwartz et al.

(10) Patent No.: US 8,970,546 B2
(45) Date of Patent: Mar. 3, 2015

(54) METHOD AND APPARATUS FOR IMPROVED INPUT SENSING USING A DISPLAY PROCESSOR REFERENCE SIGNAL

(75) Inventors: Adam Schwartz, Redwood City, CA (US); Joseph Kurth Reynolds, Alviso, CA (US)

(73) Assignee: Synaptics Incorporated, San Jose, CA (US)

( * ) Notice: Subject to any disclaimer, the term of this patent is extended or adjusted under 35 U.S.C. 154(b) by 259 days.

(21) Appl. No.: 13/602,049

(22) Filed: Aug. 31, 2012

(65) Prior Publication Data

US 2014/0062937 A1    Mar. 6, 2014

(51) Int. Cl.
*G06F 3/045*     (2006.01)

(52) U.S. Cl.
USPC .......................................... 345/174; 345/173

(58) Field of Classification Search
CPC ..... G06F 3/041; G06F 3/0416; G06F 3/0418; G06F 3/044; G01D 5/24; G02F 1/13338
USPC ........ 345/156, 173, 174, 179, 204; 178/18.06
See application file for complete search history.

(56) References Cited

U.S. PATENT DOCUMENTS

| | | | |
|---|---|---|---|
| 5,534,892 A | 7/1996 | Tagawa | |
| 5,896,120 A | 4/1999 | Iguchi et al. | |
| 6,239,788 B1 | 5/2001 | Nohno et al. | |
| 2004/0217945 A1 | 11/2004 | Miyamoto et al. | |
| 2006/0012575 A1 | 1/2006 | Knapp et al. | |
| 2006/0284639 A1* | 12/2006 | Reynolds | 324/765 |
| 2008/0062139 A1 | 3/2008 | Hotelling et al. | |
| 2008/0062140 A1 | 3/2008 | Hotelling et al. | |
| 2008/0062147 A1 | 3/2008 | Hotelling et al. | |
| 2008/0062148 A1 | 3/2008 | Hotelling et al. | |
| 2010/0001973 A1 | 1/2010 | Hotelling et al. | |
| 2010/0321034 A1* | 12/2010 | Hargreaves | 324/612 |
| 2010/0327882 A1 | 12/2010 | Shahparnia et al. | |
| 2011/0061949 A1 | 3/2011 | Krah et al. | |
| 2011/0115729 A1 | 5/2011 | Kremin et al. | |
| 2011/0148435 A1* | 6/2011 | Schwartz et al. | 324/658 |
| 2011/0175671 A1* | 7/2011 | Reynolds | 327/517 |
| 2011/0187677 A1 | 8/2011 | Hotelling et al. | |
| 2011/0210939 A1 | 9/2011 | Reynolds et al. | |
| 2011/0210940 A1 | 9/2011 | Reynolds | |
| 2011/0210941 A1 | 9/2011 | Reynolds et al. | |
| 2012/0092296 A1 | 4/2012 | Yanase et al. | |
| 2013/0244731 A1* | 9/2013 | Oishi et al. | 455/566 |
| 2013/0257745 A1* | 10/2013 | Reynolds | 345/173 |
| 2013/0265244 A1* | 10/2013 | Kim et al. | 345/173 |

OTHER PUBLICATIONS

International Search Report PCT/US2013/054176 dated Nov. 18, 2013.

* cited by examiner

*Primary Examiner* — Joe H Cheng
(74) *Attorney, Agent, or Firm* — Patterson + Sheridan, LLP

(57) ABSTRACT

Embodiments of the invention generally provide a method and apparatus that is configured to reduce the effects of interference that is undesirably provided to a transmitter signal that is delivered from a transmitter signal generating device to a sensor processor to determine if an input object is disposed within a touch sensing region of a touch sensing device. In one embodiment, the sensor processor includes a receiver channel that has circuitry that is configured to separately receive a transmitter signal delivered from a display processor and a sensor processor reference signal that is based on a display processor reference signal to reliably sense the presence of an object. Embodiments of the invention described herein thus provide an improved apparatus and method for reliably sensing the presence of an object by a touch sensing device.

33 Claims, 13 Drawing Sheets

METHOD AND APPARATUS FOR IMPROVED INPUT SENSING USING A DISPLAY PROCESSOR REFERENCE SIGNAL

BACKGROUND OF THE INVENTION

1. Field of the Invention

Embodiments of the present invention generally relate to a system and method for reliably sensing an input object's position over a sensing region of a proximity sensing device.

2. Description of the Related Art

Input devices including proximity sensor devices, also commonly called touchpads or touch sensor devices, are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems, such as opaque touchpads integrated in, or peripheral to, notebook or desktop computers. Proximity sensor devices are also often used in smaller computing systems, such as touch screens integrated in cellular phones. Many commercially available proximity sensor devices utilize one or more electrical techniques to determine the presence, location and/or motion of an input object, such as a capacitive or a resistive sensing technique. Typically, the proximity sensor devices utilize an array of sensor electrodes to detect the presence, location and/or motion of an input object.

In some configurations, proximity sensor devices are used in combination with other supporting components, such as a display or other input devices found in the electronic or computing system. In these configurations, the proximity sensor devices are coupled to the display driving components, or other similar supporting components, to provide a desired combined function or to provide a complete device package. FIG. 1 illustrate a schematic view of a touch sensitive display system 50 that includes a display driver module 20 that is configured to drive one or more common electrodes 10 for updating a display, and for capacitive sensing using one or more sensing electrodes 11 that are coupled to a touch sensing module 21. For simplicity of discussion, the touch sensitive display system 50 shown in FIG. 1 only illustrates one common electrode 10 and one sensing electrode 11, however, most capacitive sensing type touch sensitive displays will include a plurality of common electrodes 10 and a plurality of sensing electrodes 11 that are disposed in an array type pattern (not shown) to sense the positional information of an object over a desired region of the device. During operation, a sensed capacitance "$C_s$" formed between a common electrode 10 and a sensing electrode 11, when the common electrode 10 is driven for capacitive sensing, will vary as an object moves or is positioned in close proximity to the electrodes. The varying sensed capacitance "$C_s$" is measured by the touch sensing module 21, thus letting the system know that a touch has occurred. Since it is common for the display driver module 20 and the touch sensing module 21 to include separate power delivery components, due to the differences in electrical requirements needed to drive the display components and to sense the positional information of an object, it is common for the display driver module 20 and the touch sensing module 21 to be separated from each other and to be referenced to different reference voltages or grounds, such as display ground 15 and touch sensing ground 16, respectively. However, it has been found that the benefits of having separate power delivery components in each of these modules 20, 21 can lead to issues with the system's ability to reliably sense the positional information of an object, due to noise generated by the power delivery components in the display driver module 20 that affects the resulting signal received with the components in the touch sensing module 21. In these conventional configurations, the noise added to the transmitter signal(s) delivered through the common electrode(s) 10 from the display driver module 20 is not accounted for during the touch sensing process completed by the touch sensing module 21, and thus can cause the touch sensing data processed by the touch sensing module 21 to vary and give false or misleading touch sensing results.

Therefore, there is a need for a method and an apparatus that provides useful and reliable touch sensing results despite the use of separate power delivery components in the touch sensing and display driving components in a touch sensitive display system.

SUMMARY OF THE INVENTION

Embodiments of the invention generally provide a method and apparatus that is configured to reduce the effects of noise that is undesirably present in a transmitter signal that is delivered from a transmitter signal generating device to a sensor processor to determine if an input object is disposed within a touch sensing region of a touch sensing device. In one embodiment, the sensor processor includes a receiver channel that has circuitry that is configured to separately receive a transmitter signal delivered from a display processor and a sensor processor reference signal that is based on a display processor reference signal to reliably sense the presence of an object.

Embodiments of the invention generally provide an input device that includes a plurality of transmitter electrodes comprising a plurality of common electrodes configured to operate in a first mode for capacitive sensing and configured to operate in a second mode for updating a display device, a plurality of receiver electrodes, a display processor coupled to the plurality of common electrodes and configured to drive the common electrodes for capacitive sensing and updating a display device, and a sensor processor coupled to the plurality of receiver electrodes and configured to receive resulting signals with the plurality of receiver electrodes when the common electrodes are driven for capacitive sensing. The sensor processor comprises one or more receiver channels, and wherein each of the one or more receiver channels is coupled to a receiver electrode of the plurality of receiver electrodes, and each of the one or more receiver channels have a first input port configured to receive a sensor processor reference signal that is based on a display processor reference signal, and a second input port configured to receive at least a portion of the resulting signals, wherein each of the one or more receiver channels is configured to provide an output signal based on a comparison of the at least a portion of the resulting signals and the sensor processor reference signal.

Embodiments of the invention may further provide a sensor processor for an input device that includes sensor circuitry coupled to a plurality of receiver electrodes, wherein the sensor circuitry is coupled to a display processor that is configured to drive a plurality of common electrodes for capacitive sensing and updating a display device, wherein the sensor circuitry is configured to receive resulting signals with the plurality of receiver electrodes when the display processor drives the plurality of common electrodes for capacitive sensing, wherein the sensor circuitry comprises a receiver channel configured to receive a sensor processor reference signal that is based on a display processor reference signal, and wherein the receiver channel is configured to provide an output signal based on at least a portion of the received resulting signals and the sensor processor reference signal.

Embodiments of the invention may further provide a display processor for an input device that includes display driver circuitry coupled to a plurality of common electrodes and configured to drive a plurality of common electrodes for capacitive sensing and updating a display device, wherein a display processor is coupled to a sensor processor configured to receive resulting signals with a plurality of receiver electrodes when the display driver circuitry drives the plurality of common electrodes for capacitive sensing, wherein the sensor processor comprises a receiver channel having a first input port that is configured to receive a sensor processor reference signal that is based on a display processor reference signal, and wherein the receiver channel is configured to provide an output signal based on at least a portion of the received resulting signals and the sensor processor reference signal.

Embodiments of the invention may further provide a method of sensing an input object in a sensing region of an input device that includes driving a display update on at least one of a plurality of common electrodes, the common electrodes configured for capacitive sensing and updating a display device, driving a transmitter signal through on at least one of a plurality of common electrodes, receiving a resulting signal from one or more receiver electrodes, wherein the resulting signal comprises effects corresponding to the transmitter signal delivered on the at least one of the plurality of common electrodes, and comparing the resulting signal with a sensor processor reference signal that is based on a display processor reference signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
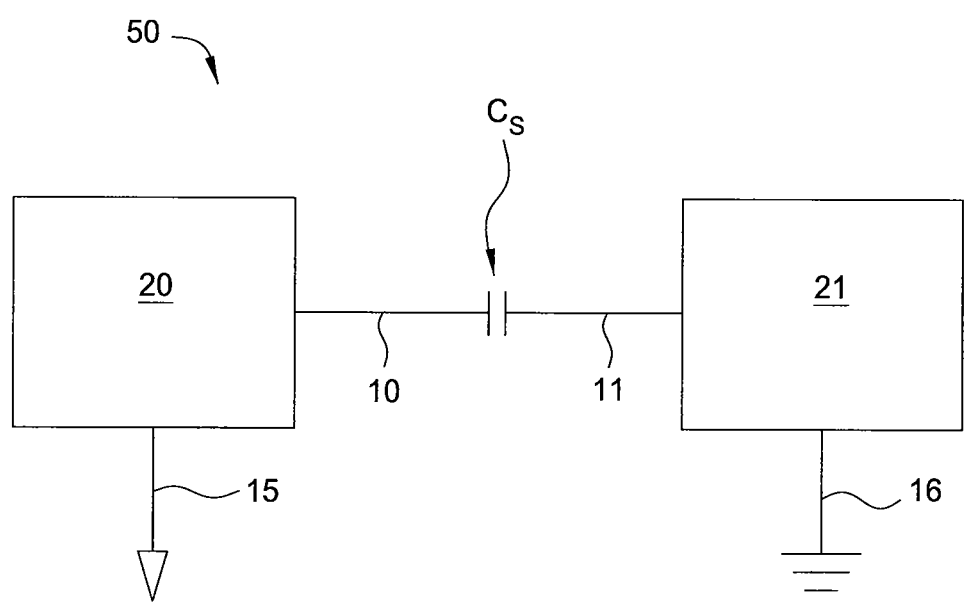
FIG. 1 is a schematic diagram of a conventional touch sensitive display device.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention generally provide a method and apparatus that is configured to minimize the effects of noise that is undesirably provided to a transmitter signal delivered from a transmitter signal generating device, such as a display processor, to a sensor processor that is configured to receive and process the resulting signal to determine if an input object is disposed within a touch sensing region of a touch sensing device. In one embodiment, the sensor processor includes a receiver channel that has circuitry that is configured to separately receive a resulting signal comprising effects of a transmitter signal delivered from a display processor and a sensor processor reference signal that is based on a display processor reference signal. Embodiments of the invention described herein thus provide an improved apparatus and method for reliably sensing the presence of an object by a touch sensing device.

Figure 2A:
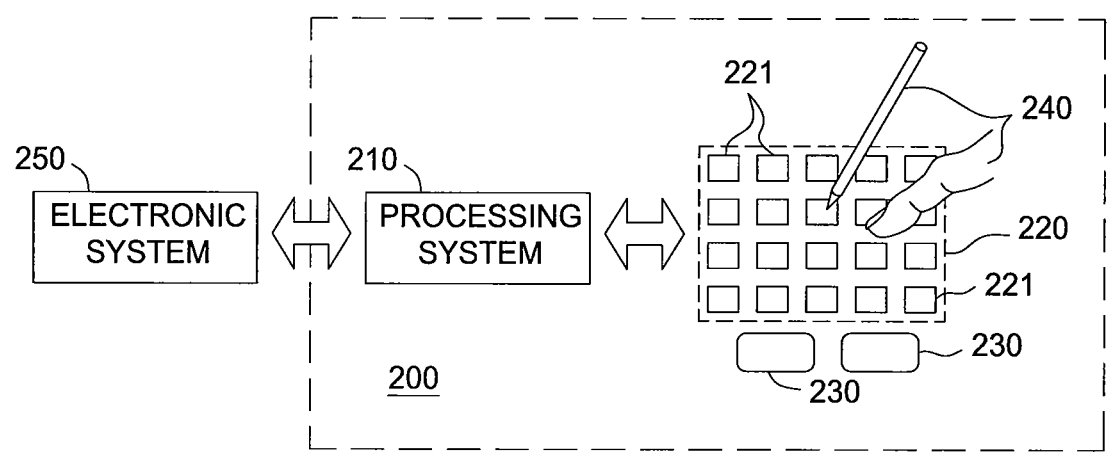
FIG. 2A is a schematic block diagram of an input device in accordance with embodiments of the invention.

FIG. 2A is a block diagram of an exemplary input device 200, in accordance with embodiments of the invention. In FIG. 2A, the input device 200 is a proximity sensor device (e.g., "touchpad," "touch screen," "touch sensor device") configured to sense inputs provided by one or more input objects 240 positioned in a sensing region 220. Example input objects include fingers and styli, as shown in FIG. 2A. In some embodiments of the invention, the input device 200 may be configured to provide input to an electronic system 250, which is sometime referred to herein as the "host." As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include input device 200 and separate joysticks or key switches. Further examples of electronic systems 250 include peripherals, such as data input devices (e.g., remote controls and mice) and data output devices (e.g., display screens and printers). Other examples include remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device 200 can be implemented as a physical part of the electronic system 250, or can be physically separate from the electronic system. As appropriate, the input device 200 may communicate with parts of the electronic system 250 using any one or more of the following: buses, networks, and other wired or wireless interconnections. Examples include $I^2C$, SPI, PS/2, Universal Serial Bus (USB), Bluetooth, RF, and IRDA.

Sensing region 220 encompasses any space above, around, in and/or near the input device 200 in which the input device 200 is able to detect user input by one or more input objects 240. The sizes, shapes, and locations of particular sensing regions may vary widely from embodiment to embodiment. In some embodiments, the sensing region 220 extends from a surface of the input device 200 in one or more directions into space until signal-to-noise ratios prevent sufficiently accurate object detection. The distance to which this sensing region 220 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 200, contact with an input surface (e.g., a touch surface) of the input device 200, contact with an input surface of the input device 200 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 220 has a rectangular shape when projected onto an input surface of the input device 200.

The input device 200 may utilize any combination of sensor components and sensing technologies to detect user input in the sensing region 220. The input device 200 generally comprises one or more sensing elements 221 for detecting user input. As several non-limiting examples, the one or more sensing elements 221 in the input device 200 may use capacitive, elastive, resistive, inductive, magnetic acoustic, ultrasonic, and/or optical techniques to detect the position or motion of the input object(s) 240. Some implementations are configured to provide sensing images that span one, two, three, or higher dimensional spaces.

In FIG. 2A, a processing system 210 is shown as part of the input device 200. The processing system 210 is configured to operate the hardware of the input device 200 to detect input in the sensing region 220. The processing system 210 comprises parts of or all of one or more integrated circuits (ICs) and/or other circuitry components. In some embodiments, the processing system 210 also comprises electronically-readable instructions, such as firmware code, software code, and/or the like. In some embodiments, components composing the processing system 210 are located together, such as near sensing element(s) 221 of the input device 200. In other embodiments, components of processing system 210 are physically separate with one or more components close to sensing elements 221 of input device 200, and one or more components elsewhere. For example, the input device 200 may be a peripheral coupled to a desktop computer, and the processing system 210 may comprise software configured to run on a central processing unit of the desktop computer and one or more ICs (perhaps with associated firmware) separate from the central processing unit. As another example, the input device 200 may be physically integrated in a phone, and the processing system 210 may comprise circuits and firmware that are part of a main processor of the phone. In some embodiments, the processing system 210 is dedicated to implementing the input device 200. In other embodiments, the processing system 210 also performs other functions, such as operating display screens, driving haptic actuators, etc.

The processing system 210 may be implemented as a set of modules that handle different functions of the input device 200. Each module may comprise circuitry that is a part of the processing system 210, firmware, software, or a combination thereof. In various embodiments, different combinations of modules may be used. In one example, modules include hardware operation modules for operating hardware such as sensing elements and display screens, data processing modules for processing data, such as sensor signals, and positional information, and reporting modules for reporting information. In another example, modules include sensor operation modules configured to operate sensing element(s) to detect input, identification modules configured to identify gestures such as mode changing gestures, and mode changing modules for changing operation modes.

In some embodiments, the processing system 210 responds to user input (or lack of user input) in the sensing region 220 directly by causing one or more actions. In one example, actions include changing operation modes, as well as GUI actions, such as cursor movement, selection, menu navigation, and other functions. In some embodiments, the processing system 210 provides information about the input (or lack of input) to some part of the electronic system (e.g., to a central processing system of the electronic system that is separate from the processing system 210, if such a separate central processing system exists). In some embodiments, some part of the electronic system process information received from the processing system 210 is used to act on user input, such as to facilitate a full range of actions, including mode changing actions and GUI actions. For example, in some embodiments, the processing system 210 operates the sensing element(s) 221 of the input device 200 to produce electrical signals indicative of input (or lack of input) in the sensing region 220. The processing system 210 may perform any appropriate amount of processing on the electrical signals in producing the information provided to the electronic system. For example, the processing system 210 may digitize analog electrical signals obtained from the sensing elements 221. As another example, the processing system 210 may perform filtering or other signal conditioning. As yet another example, the processing system 210 may subtract or otherwise account for a baseline set of data (e.g., baseline image), such that the information reflects a difference between the acquired electrical signals (e.g., sensing image) and the baseline. As yet further examples, the processing system 210 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 200 is implemented with additional input components that are operated by the processing system 210 or by some other processing system. These additional input components may provide redundant functionality for input in the sensing region 220, or some other functionality. FIG. 2A shows buttons 230 near the sensing region 220 that can be used to facilitate selection of items using the input device 200. Other types of additional input components include sliders, balls, wheels, switches, and the like. Conversely, in some embodiments, the input device 200 may be implemented with no other input components.

In some embodiments, the input device 200 comprises a touch screen interface, and the sensing region 220 overlaps at least part of an active area of a display screen of a display device 290. For example, the input device 200 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 200 and the display device 290 may share physical elements. Some embodiments of the input device 200 include at least part of the display device 290. For example, some embodiments may utilize some of the same electrical components for displaying and sensing. In some examples, the display screen of the display device 290 may be operated in part or in total by the processing system 210.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 210). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In many embodiments, the positional information of the input object 240 relative to the sensing region 220 is monitored or sensed by use of one or more sensing elements 221 (FIG. 2A) that are positioned to detect its "positional information." In general, the sensing elements 221 may comprise one or more sensing elements or components that are used to detect the presence of an input object. As discussed above, the one or more sensing elements 221 of the input device 200 may use capacitive, elastive, resistive, inductive, magnetic acoustic, ultrasonic, and/or optical techniques to sense the positional information of an input object. While the information presented below primarily discuses the operation of an input device 200, which uses capacitive sensing techniques to monitor or determine the positional information of an input object 240 this configuration is not intended to be limiting as to the scope of the invention described herein, since other sensing techniques may be used.

In some resistive implementations of the input device 200, a flexible and conductive first layer is separated by one or more spacer elements from a conductive second layer. During operation, one or more voltages are applied between adjacent layers. When an input object 240 touches the flexible first layer it may deflect sufficiently to create electrical contact between the layers, resulting in current or voltage outputs reflective of the point(s) of contact between the layers. These resulting current or voltage outputs may be used to determine positional information.

In some inductive implementations of the input device 200, one or more sensing elements pick up loop currents induced by a resonating coil or pair of coils. Some combination of the magnitude, phase, and frequency of the currents may then be used to determine positional information of the input object 240 positioned over the sensing region 220.

In one embodiment of the input device 200, the sensing element 221 is a capacitive sensing element that is used to sense the positional information of the input object(s). In some capacitive implementations of the input device 200, voltage or current is applied to the sensing elements to create an electric field between an electrode and ground. Nearby input objects 240 cause changes in the electric field, and produce detectable changes in capacitive coupling that may be detected as changes in voltage, current, or the like. Some capacitive implementations utilize arrays or other regular or irregular patterns of capacitive sensing elements to create electric fields. In some capacitive implementations, portions of separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between one or more sensing elements, or one or more sensor electrodes, and an input object. In various embodiments, an at least partially grounded input object positioned near the sensor electrodes alters the electric field near the sensor electrodes, thus changing the measured capacitive coupling of the sensor electrodes to ground. In one implementation, an absolute capacitance sensing method operates by modulating sensor electrodes with respect to a reference voltage (e.g., system ground), and by detecting the capacitive coupling between the sensor electrodes and the at least partially grounded input object(s).

Some capacitive implementations utilize "mutual capacitance" (or "transcapacitance") sensing methods based on changes in the capacitive coupling between two or more sensing elements (e.g., sensor electrodes). In various embodiments, an input object near the sensor electrodes alters the electric field created between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

Figure 2B:
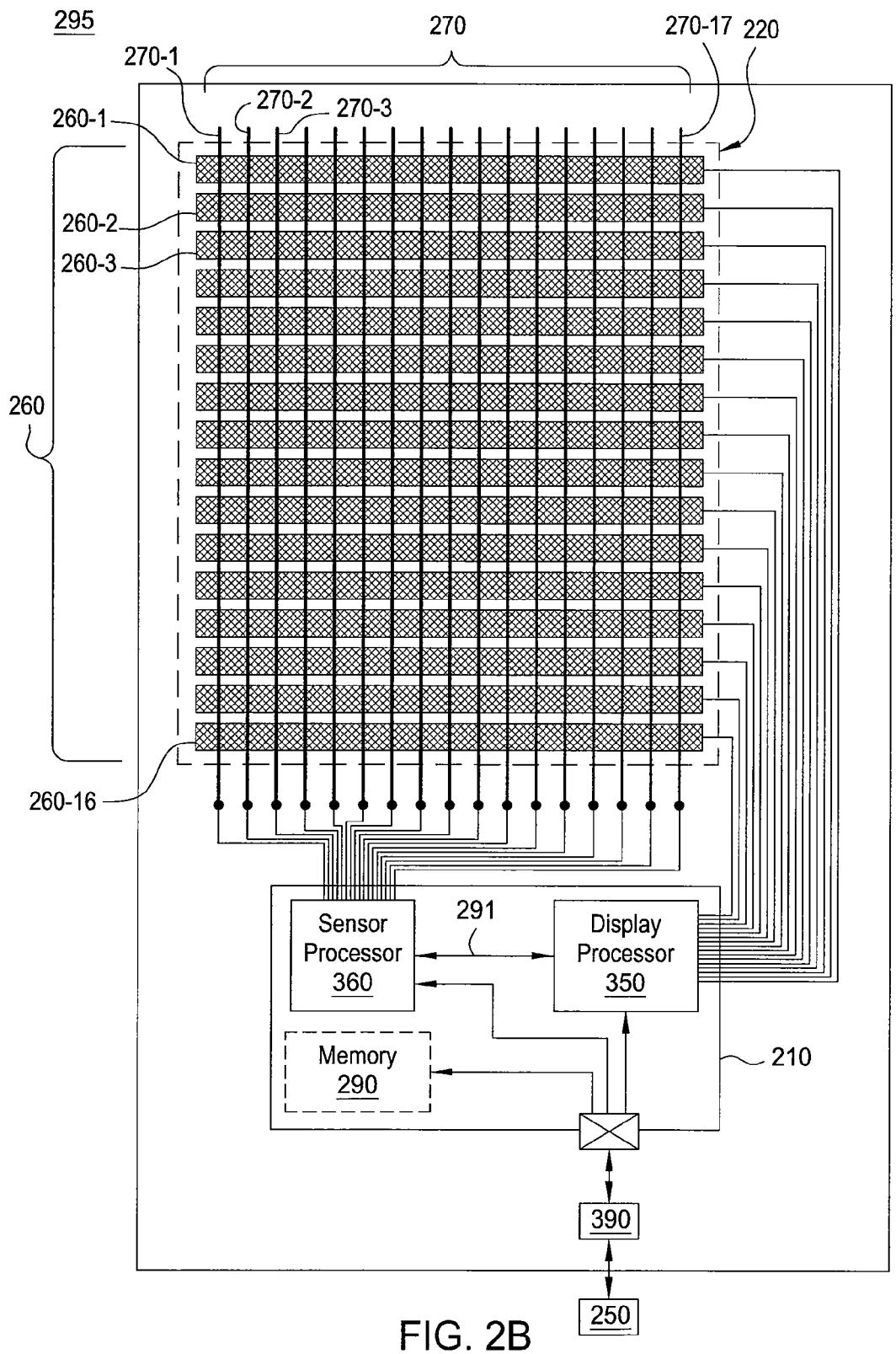
FIG. 2B is a schematic diagram illustrating one example of an input device according to one or more of the embodiments described herein.

FIG. 2B is a schematic top view of an input device 295 that has a sensor electrode pattern that may be used to sense the positional information of an input object within the sensing region 220. The input device 295 may be formed as part of the larger input device 200, which is discussed above. For clarity of illustration and description, FIG. 2B illustrates a pattern of simple rectangles and thick lines, and does not show all of the interconnecting features and/or other related components. While FIG. 2B illustrates a pattern of simple rectangles and thick lines, this is not meant to be limiting and in other embodiments, various sensor electrode shapes and/or surface areas may be used.

The input device 295 comprising sensor electrodes 260, sensor electrodes 270 and a processing system 210. In some embodiments of the invention, as discussed further below, the sensor electrodes 260 may be used to update parts of a display and for capacitive sensing, and thus are referred to herein as "common electrodes," and the sensor electrodes 270 are configured to receive the resulting signal(s) comprising effects of a transmitter signal(s) delivered through the common electrode(s), and thus are referred to herein as "receiver electrodes."

The processing system 210 may comprise a sensor processor 360, a display processor 350 and a synchronization mechanism 291 that is coupled to the sensor processor 360 and the display processor 350. The sensor processor 360 and the display processor 350 are illustrated in FIGS. 3-7 and are discussed further below. In cases where the processing system 210 comprises more than one processing system ICs, such as shown in FIG. 2B, synchronization between separate processors may be achieved by communicating between these systems using a synchronization mechanism 291. For example, the synchronization mechanism 291 may synchronize display updating cycle and capacitive sensing cycle by providing a synchronized clock, information about display update state, information about the capacitive sensing state, direction to display update circuitry to update (or not to update), direction to capacitive sensing circuitry to sense (or not to sense), reference signals and/or the like.

In some embodiments, sensor electrodes 260 and sensor electrodes 270 may be similar in size and/or shape. In one example, as shown, these sensor electrodes are disposed in a sensor electrode pattern that comprises a first plurality of sensor electrodes 260 (e.g., sensor electrodes 260-1, 260-2, 260-3, . . . 260-16 as illustrated in FIG. 2B) and a second plurality of sensor electrodes 270 (e.g., sensor electrodes 270-1, 270-2, 270-3, . . . 270-17 as illustrated in FIG. 2B), which may disposed above, below, or on the same layer as the first plurality of sensor electrodes 260. One will note that the sensor electrode pattern of FIG. 2B may alternatively utilize various sensing techniques, such as mutual capacitive sensing, absolute capacitive sensing, elastive, resistive, inductive, magnetic acoustic, ultrasonic, or other useful sensing techniques, without deviating from the scope of the invention described herein.

Sensor electrodes 260 and sensor electrodes 270 are typically ohmically isolated from each other. That is, one or more insulators separate sensor electrodes 260 and sensor electrodes 270 and prevent them from electrically shorting to each other in regions where they may overlap. In some embodiments, sensor electrodes 260 and sensor electrodes 270 are separated by electrically insulative material disposed between them at cross-over areas. In such configurations, the sensor electrodes 260 and/or sensor electrodes 270 may be formed with jumpers connecting different portions of the same electrode. In some embodiments, sensor electrodes 260 and sensor electrodes 270 are separated by one or more layers of electrically insulative material. In some other embodiments, sensor electrodes 260 and sensor electrodes 270 are separated by one or more substrates, for example, they may be disposed on opposite sides of the same substrate, or on different substrates that are laminated together. In other some embodiments, sensor electrodes 260 and sensor electrodes 270 may be similar in size and shape. In various embodiments, as will be discussed in more detail later, sensor electrodes 260 and sensor electrodes 270 may be disposed on a single layer of a substrate. In yet other embodiments, other electrodes, including but not limited to, a shield electrode(s) may be disposed proximate to either sensor electrodes 260 or 270. The shield electrode may be configured to shield sensor electrodes 260 and/or sensor electrodes 270 from interference such as nearby sources of driven voltages and/or currents. In some embodiments, the shield electrode(s) may be disposed with sensor electrodes 260 and 270 on a common side of a substrate. In other embodiments, the shield electrode(s) may be disposed with sensor electrodes 260 on a common side of a substrate. In other embodiments, the shield electrode(s) may be disposed with sensor electrodes 270 on a common side of a substrate. In yet other embodiments, the shield electrode may be disposed on a first side of a substrate while sensor electrodes 260 and/or sensor electrodes 270 are disposed on a second side, opposite the first.

In one embodiment, the areas of localized capacitive coupling between sensor electrodes 260 and sensor electrodes 270 may be termed "capacitive pixels." The capacitive coupling between the sensor electrodes 260 and sensor electrodes 270 change with the proximity and motion of input objects in the sensing region associated with the sensor electrodes 260 and sensor electrodes 270.

In some embodiments, the sensor pattern is "scanned" to determine these capacitive couplings. That is, the sensor electrodes 260 are driven to transmit transmitter signals. The input device 295 may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of sensor electrodes 270 to be independently determined. The sensor electrodes 270 may be operated singly or multiply to acquire (or receive) resulting signals (i.e., received capacitive sensing signals). The resulting signals may be used to determine measurements of the capacitive couplings at the capacitive pixels, which are used to determine whether an input object is present and its positional information, as discussed above. A set of values for the capacitive pixels form a "capacitive image" (also "capacitive frame" or "sensing image") representative of the capacitive couplings at the pixels. Multiple capacitive images may be acquired over multiple time periods, and differences between them used to derive information about input object(s) in the sensing region. For example, successive capacitive images acquired over successive periods of time can be used to track the motion(s) of one or more input objects entering, exiting, and within the sensing region. In various embodiments, the sensing image, or capacitive image, comprises data received during a process of measuring the resulting signals received with at least a portion of the sensing elements 221 distributed across the sensing region 220. The resulting signals may be received at one instant in time, or by scanning the rows and/or columns of sensing elements distributed across the sensing region 220 in a raster scanning pattern (e.g., serially poling each sensing element separately in a desired scanning pattern), row-by-row scanning pattern, column-by-column scanning pattern or other useful scanning technique. In many embodiments, the rate that the "sensing image" is acquired by the input device 200, or sensing frame rate, is between about 60 and about 180 Hertz (Hz), but can be higher or lower depending on the desired application.

In some touch screen embodiments, the sensor electrodes 260 and/or the sensor electrodes 270 are disposed on a substrate of the associated display device. For example, the sensor electrodes 260 and/or the sensor electrodes 270 may be disposed on a polarizer, a color filter substrate, or a glass sheet of an LCD. As a specific example, the sensor electrodes 260 may be disposed on a TFT (Thin Film Transistor) substrate of an LCD, and may or may not also be used in display operations of the display device. As another example, the receiver electrodes 270 may be disposed on a color filter substrate, on an LCD glass sheet, on a protection material disposed over the LCD glass sheet, on a lens glass (or window), and the like.

In some touchpad embodiments, the sensor electrodes 260 and/or the sensor electrodes 270 are disposed on a substrate of the touchpad. In such an embodiment, the sensor electrodes and/or the substrate may be substantially opaque. In one embodiment, an opaque material may be disposed between the sensor electrodes, the substrate and/or the surface of the sensing region 220. In some embodiments, the substrate and/or the sensor electrodes may comprise a substantially transparent material. In various embodiments, one or more substrates of the touchpad may be textured to facilitate improved user input.

In those embodiments, where sensor electrodes 260 and/or sensor electrodes 270 are disposed on a substrate within the display device (e.g., color filter glass, TFT glass, etc.), the sensor electrodes may be comprised of a substantially transparent material (e.g., ITO, ATO) or they may be comprised of an opaque material and aligned with the pixels of the display device (e.g., disposed such that they overlap with the "black mask" between pixel dots or a subpixel of the pixel).

In some touch screen embodiments, as shown in FIG. 2B, transmitter electrodes comprise one or more common electrodes (e.g., segments of a segmented "V-com electrode"), hereafter referred to as "common electrodes 260," used in updating the display of the display screen. While the sensor electrodes, or common electrodes 260, can be used to perform other capacitive sensing techniques, as discussed above, for clarity and simplicity of the discussion a common electrode capacitive sensing configuration is primarily used in the discussion below. These common electrodes 260 (e.g., reference numerals $260_1$, $260_2$, $260_3$, ... $260_{16}$ shown in FIG. 2B) may be disposed on an appropriate display screen substrate. For example, the common electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each transmitter electrode comprises one or more common electrodes 260.

In various embodiments, the common electrodes 260 transmit signals for display updating and capacitive sensing in the same time period, or in different time periods. For example, the common electrodes may transmit signals for display updating during a display-update time of a row update cycle, and transmit signals for capacitive sensing during a non-display time of the row update cycle (e.g. sometimes called "horizontal blanking time"). In another example, the common electrodes may transmit signals for display updating during a display-update time of a row update cycle, and transmit signals for capacitive sensing during a multiple combined non-display times of the row update cycles (e.g., sometimes called "long horizontal blanking time" or "in-frame blanking time"). As another example, the common electrodes may transmit signals for display updating during row update cycles with actual display row updates, and transmit signals for capacitive sensing during extra "row update cycles" without actual display row updates (e.g., the non-display times between updating sections of frames or entire frames, sometimes called "vertical blanking time"). Further, in various embodiments, the common electrodes may transmit signals for capacitive sensing during any combination of the above non-display times. As a further example, the common electrodes may transmit signals simultaneously for display updating and capacitive sensing, but separate them spatially. As yet another example, the common electrodes may use the same transmission for both display updating and capacitive sensing.

In FIG. 2B, sensor processor 360 is coupled to the receiver electrodes 270 so that it is able to receive the resulting signals from the receiver electrodes. Display processor 350 is coupled with common electrodes 260, and comprises display circuitry (not shown) configured for displaying images on the display screen. The display circuitry is configured to apply one or more pixel voltage(s) to the display pixel electrodes through pixel source drivers (not shown). The display circuitry is also configured to apply one or more common drive voltage(s) to the sensor electrodes 260, and operate them as common electrodes of the display screen. In some embodiments (e.g., line inversion embodiments), the display circuitry is also configured to invert the common drive voltage in synchronization with a drive cycle of the image display. The display processor 350 is also configured to operate common electrodes 260 as transmitter electrodes for capacitive sensing. In one embodiment the common electrodes 260 are configured to be scanned while the receiver electrodes 270 are receiving a signal from the common electrodes 260. In some configurations, the receiver electrodes 270 may be similar to the sensor electrodes 270 that are discussed above.

Input Device Configurations

Figure 3A:
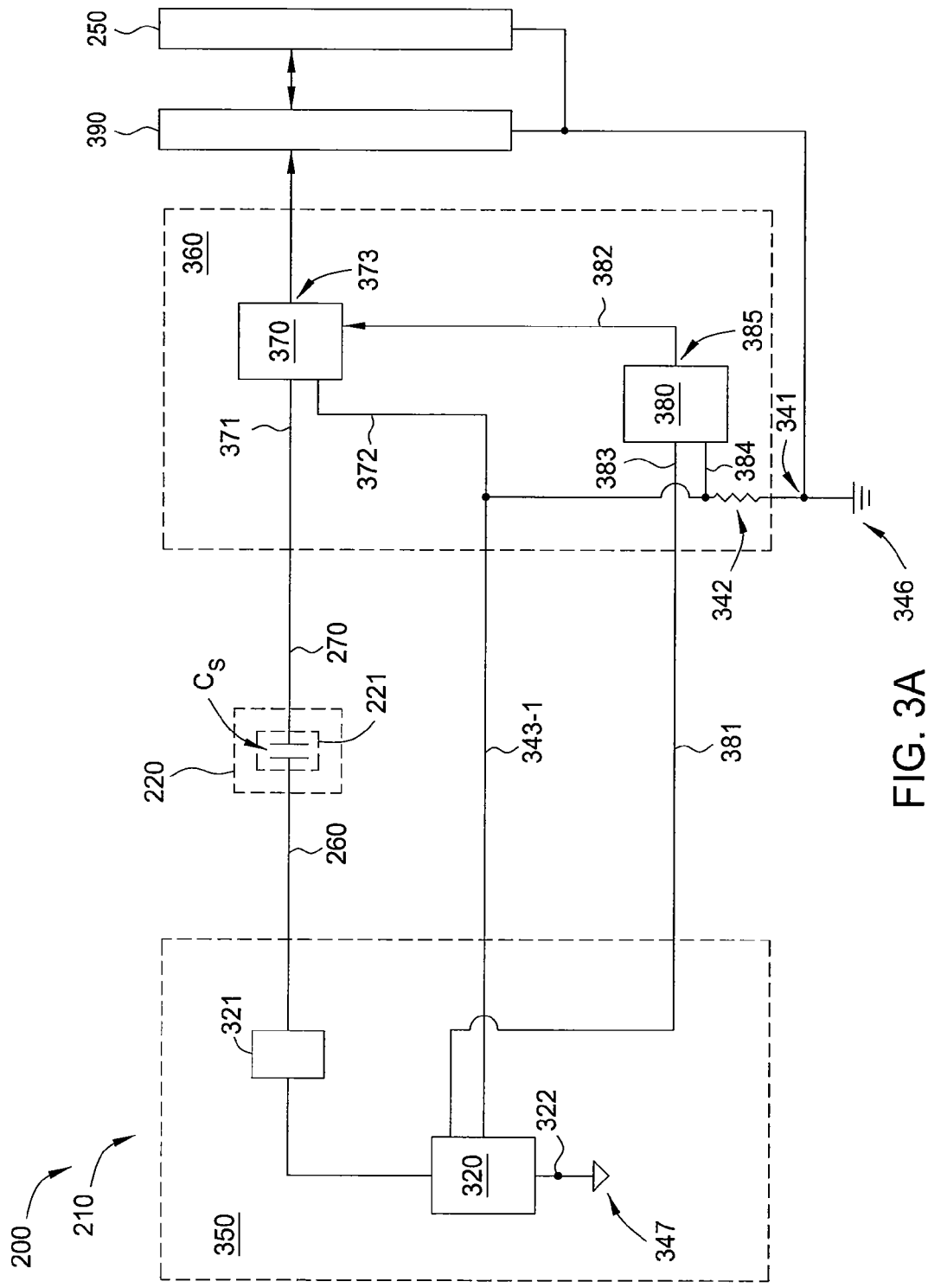
FIG. 3A is a schematic diagram illustrating one example of an input device according to one or more of the embodiments described herein.
Figure 3B:
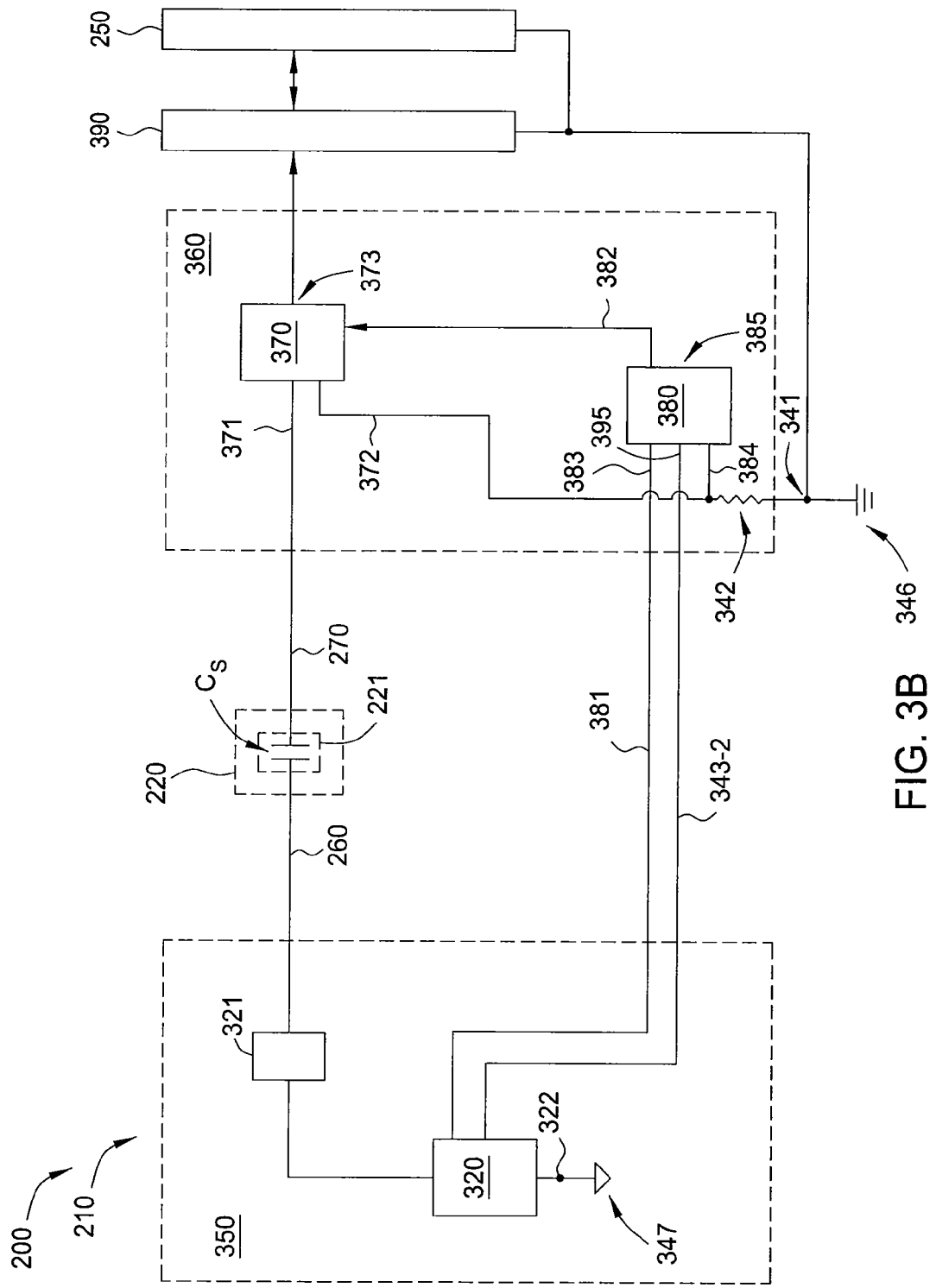
FIG. 3B is a schematic diagram illustrating one example of an input device according to one or more of the embodiments described herein.

FIGS. 3A and 3B are schematic views of a portion of the processing system 210 of the input device 200 according to one or more of the embodiments described herein. As discussed above, the display processor 350 and sensor processor 360 work together to provide touch sensing data to an analysis module 390. The analysis module 390 may form part of the processing system 210, and/or part of the electronic system 250. In one embodiment, analysis module 390 may form part of the sensor processor 360. In various embodiments, the analysis module 390 will comprises digital signal processing elements and/or other useful digital and analog circuit elements that are connected to process the receiver channel output signal(s) received from at least one receiver channel, and also provide processed signals to other portions of the electronic system 250. The electronic system 250 can then use the processed signals to control some aspect of the input device 200, such as send a message to the display, perform some calculation or software related task based on instructions created by one or more software programs that are being run by the electronic system and/or perform some other function.

In various embodiments, the display processor 350 comprises a drive voltage supply 320 and display circuitry that is able to drive display update signals onto a plurality of common electrodes for display updating and to transmit transmitter signals with a plurality of common electrodes for capacitive sensing. In one embodiment, display processor 350 transmits a transmitter signal with transmitter electrode 260-1 which is capacitively coupled with receiver electrode 270-1, where the capacitive coupling is labeled as sensor capacitor $C_s$ (i.e., reference label 221) in FIGS. 3A and 3B. A measurement of a change in transcapacitive (or mutual-capacitive) may be based on a change in the capacitive coupling between transmitter electrode 260-1 and receiver electrode 270-1. Although not shown, in various embodiments, driver 321 and receiver channel 370 may both be coupled to each of the sensor electrodes of the input device 200. In such embodiments, when each sensor electrode is driven with a transmitter signal, a change in capacitive coupling between a sensor electrode and an input object(s) in the sensing region may be measured, providing a measurement of a self-capacitance (or absolute capacitance). In some configurations, the common electrodes forming transmitter electrodes 260 may be disposed on the TFT glass in some display screens (e.g., In Plane Switching (IPS) or Plane to Line Switching (PLS)), or on the bottom of the color filter glass of some display screens (e.g., Patterned Vertical Alignment (PVA) or Multi-domain Vertical Alignment (MVA), etc.). In some configurations, the display circuitry may comprise a driver 321 that is configured to deliver transmitter signals provided from the drive voltage supply 320 to each of the common electrodes. The transmitter signals may be selectively transmitted to one or more of the common electrodes at a time by use of electrical components, such as switches, shift registers and/or other useful components, to perform the touch sensing operation.

During the capacitive sensing operation, the drive voltage supply 320 is configured to deliver a transmitter signal, which may comprise a square, sine, rectangular, trapezoidal, Gaussian or other shaped waveform, that is delivered through one or more of the transmitter electrodes 260 and a resulting signal is then received by one or more receiver electrodes 270. In some embodiments, the drive voltage supply 320 is configured to deliver a transmitter signal comprising a voltage pulse that transitions from a first reference voltage level to a second reference voltage level. In some configurations, the drive voltage supply 320 is configured to deliver a transmitter signal that comprises a transmitter signal, which may comprise a voltage pulse, that transitions from a display processor reference voltage level, or display driver low voltage level (e.g., display driver reference level ($DCV_{com}$)), to a source voltage level ($V_{TX}$). In one example, the transmitter signal transitions from $DCV_{com}$ to $V_{TX}$ and may have a magnitude of between 1 and 15 volts and a duration that is between 0.1 and 50 microseconds (μs). However, in other embodiments, the transmitter signal transitions from $DCV_{com}$ to $V_{TX}$ and may have a magnitude of less than 1 volt or greater than 15 volts, with a duration that may be below 0.1 microseconds and greater than 50 microseconds.

In many embodiments, the sensor processor 360 comprises sensor circuitry that is able to receive and/or process resulting signals with receiver electrode 270-1. Further, sensor processor 360 may comprise sensor circuitry that is able to process and/or transmit analog and/or digital signals to various electrical components that are used to process, distribute and/or control portions of the input device 200, as discussed above. The sensor processor 360 may comprise sensor circuitry that contains a plurality of logic elements, flip-flops, multiplexers, operational amplifiers, ND converts, D/A converters, current scalers, mixers and/or other useful circuit elements that are connected in a desired way to perform part of the process of sensing an input object 240 (as seen in FIG. 2A). The sensor processor 360 is may be configured to receive input from the various components found in the input device 200, process the received inputs and deliver control or command signals when necessary to perform a desired portion of the process of sensing the positional information of an input object 240.

In one embodiment, the sensor processor 360 comprises one or more receiver channels 370 that each has a first input port 371 that is configured to receive the resulting signal received with at least one receiver electrode 270, a second input port 372 that is configured to receive a sensor processor reference signal and an output port 373. During operation the sensor processor reference signal, received by the second input port 372, is compared with the resulting signal, received by the first input port 371, using electrical circuit elements in the receiver channel 370 to produce a receiver channel output signal. The circuit elements in the receiver channel 370 then deliver the receiver channel output signal to the analysis module 390 and electronic system 250.

In some embodiments, the sensor processor 360 has a system ground 346 that is coupled to the ground of the analysis module 390 and/or the ground of an electronic system 250, so that the receiver channel output signal can be received and reliably processed by the analysis module 390 and/or an electronic system 250. As shown in FIGS. 3A and 3B, the sensor processor system ground 346 may be coupled to the ground of the analysis module 390 and/or the ground of the electronic system 250, and also the second input port 372 of the receiver channels 370 through a resistor 342. However, in many embodiments, the output of the drive voltage supply 320 is referenced to a low voltage level relative to the system ground 346 to assure that the display updating functions provided by the display processor 350 work properly. In some configurations, the drive voltage supply 320 is referenced to a display processor ground 347 at about −0.1 to about −2 volts difference relative to the system ground 346 of the sensor processor or the host device, or in other words the voltage level of a point 322 on a line coupled to the display processor ground 347 is between about 0.1 to about 2 volts lower relative to a point 341 measured at the system ground 346 of the sensor processor 360 or the host device. In one embodiment, the difference between the point 341 of the system ground 346 and the point 322 of the display processor ground 347 during operation is about negative one volt (i.e., −1 volt). In another embodiment, the display processor ground 347 may not be directly coupled with system ground 346. However, in this configuration, the display processor ground 347 may be substantially at the same level as system ground 346. In either embodiment, there may be differences between these ground references which may cause related electrical interference to appear in the resulting signals received by a receiver channel with a corresponding receiver electrode. This will be discussed in further details below.

In various embodiments of the processing system 210 illustrated in 3A and 3B, an optional reference channel 380 is added to the sensor processor 360 to provide one or more reference channel output signals that are used by the analog-to-digital conversion elements in the receiver channel 370 and/or the analysis module 390 to set a desired range to which the received resulting signal are compared to further provide reliable input sensing information to the analysis module 390 and electronic system 250. In one example, an output of the drive voltage supply 320 is delivered to an input of the reference channel 380, which is then processed to form one or more reference channel output signals. In one embodiment, the output of the drive voltage supply 320 that is delivered to an input of the reference channel 380 is a transmitter signal. In another embodiment, a first output and a second output of the drive voltage supply are delivered to an input of the reference channel 380 through line 381, which are then processed to form one or more reference channel output signals. In one embodiment, the reference channel 380 may include one or more reference channels (e.g., reference channels $380_1$, $380_2$ illustrated in FIGS. 4A, 4B, 5A, 5B, 6A, and 6B) that each have a first reference input port 383 that is configured to receive a reference channel input signal based on a signal received from the drive voltage supply 320, a second reference input port 384 that is configured to receive the sensor processor reference signal. In some embodiments the sensor processor reference signal may be based on display processor reference signal delivered through the connection 343. In various embodiments, during operation the reference channel input signal received from the display processor 350 is compared with the sensor processor reference signal using electrical circuit elements in the reference channel 380, and then the circuit elements in the reference channel 380 deliver a processed reference channel output signal through the output port 385 to a signal line 382 that is coupled to the receiver channel 370 (FIGS. 3-6) and/or the analysis module 390 (FIG. 7A). The processed reference channel output signal delivered from the reference channel(s) 380 is then compared with the processed resulting signal from the receiver channel(s) 370 to provide reliable processed capacitive sensing data to the analysis module 390.

In various embodiments to reconcile the differences between the ground references and account for interference created by having power delivery components that are each separately connected to different reference voltages (i.e., grounds), embodiments of the invention described herein, provide a processing system 210 that includes a sensor processor reference signal, which is based on a display processor reference signal, which is used by the receiver channels 370 to provide a reliable receiver channel output signal to the analysis module 390. Referring to FIG. 3A, in one embodiment, the processing system 210 includes a connection 343 that is used to define a reference level of the sensor processor 360 based on a reference level of drive voltage supply 320. In one embodiment, connection 343-1 capacitively couples a reference level of the drive voltage supply 320 with the sensor processor 360. Further, in another embodiment, connection 343-1 couples a reference level of drive voltage supply 320 with the second input 372 of the receiver channel(s) 370. The connection 343-1 can then be used to provide the sensor processor reference signal that is compared with the resulting signals, which are received by the receiver electrodes 270, using a receiver channel 370 to detect the positional information of an input object 240 positioned near one or more of the electrodes.

Referring to FIG. 3B, in one embodiment, the processing system 210 includes a connection 343-2 that is used to couple the display reference signal to the reference channel 380 through an input connection 395. In one embodiment, the connection 343-2 and input connection 395 (e.g., reference numeral 474 in FIGS. 4B, 5B, 6B and 7B) are coupled to the first input port (i.e., input port 383) of reference channel 380, thereby providing the display reference signal to the first input port. In various embodiments, connection 343-2 may comprise a capacitor (e.g., $C_{G1}$ and/or $C_{G2}$ in FIGS. 4B, 5B, 6B and 7B) that may be internal or external to sensor processor 360. Connection 343-2 AC couples interference due to the display reference signal with the input to the reference channel such the reference channel output signal may be used to substantially reduce interference due to the display reference signal in a resulting signal by the receiver channel 370, providing a receiver channel output signal. The receiver channel output signal may then be used to detect the positional information of an input object 240 positioned near one or more of the electrodes.

Sensing configurations that do not utilize a sensor processor reference signal that is based on or in some way substantially similar to a display processor reference signal, or a reference channel input signal that is based on the display processor reference signal will be affected by the interference that is created by the difference between the sensor processor reference signal and the display processor reference signal, since the resulting signal(s) may comprise interference that is not accounted for when the interference affected resulting signal is compared with an unreferenced input signal provided to the second input 372 of a receiver channel 370. The addition of the interference in a conventionally configured device will cause the output of the receiver channel components to vary, which thus can affect the reliability of the data delivered to the analysis module 390 and the ability of the input device to reliably sense an input object 240. In one embodiment, sensor processor 360 comprises at least a portion of analysis module 390.

In one embodiment, the sensor processor reference signal is formed by coupling the second input 372 of the receiver channel 370 to the display processor ground 347 of the display processor 350. In such embodiments, display processor ground 347 may be referred to as a display processor reference signal. In some configurations, as illustrated in FIGS. 4A, 5A, 6A and 7A, a system capacitance $C_{GS}$, AC couples the components connected to the second input 372 of the receiver channel 370 via an AC coupling capacitor to the display processor ground 347 of the display processor 350, which is illustrated in FIG. 3A as connection 343-1. Alternatively, the AC coupling capacitor could be internal to the sensor processor 360. In yet another embodiment, the sensor processor reference signal is formed by connecting the second input 372 to one or more circuit elements (e.g., resistors (not shown), power supply (not shown), level-shifters) that are connected to the display processor ground 347. In this configuration, the one or more circuit elements can be configured to adjust the voltage difference between the display processor ground 347 and the system ground 346 to provide a sensor processor reference signal level.

Figure 4A:
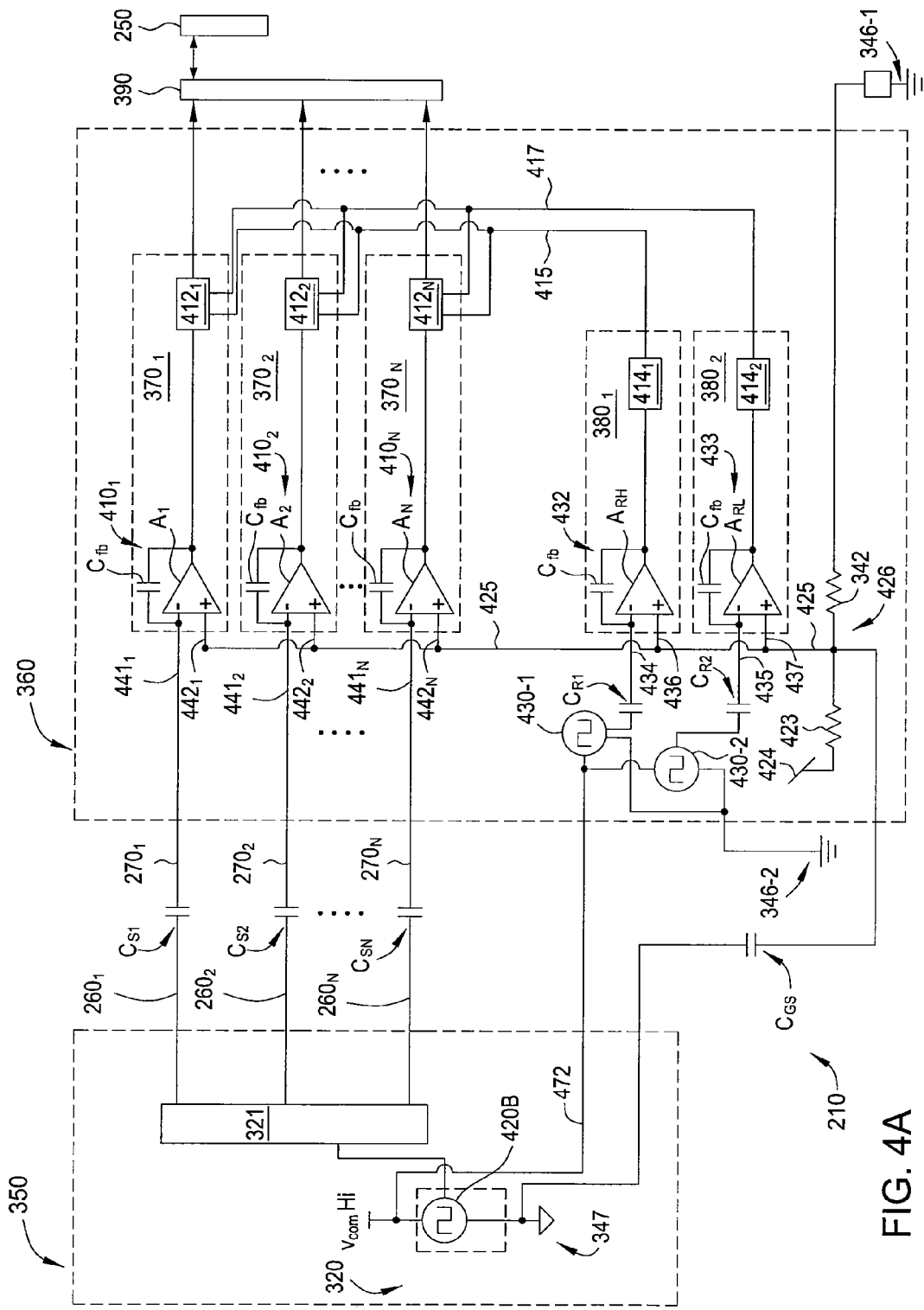
FIG. 4A is a schematic diagram illustrating one example of an input device according to one or more of the embodiments described herein.
Figure 4B:
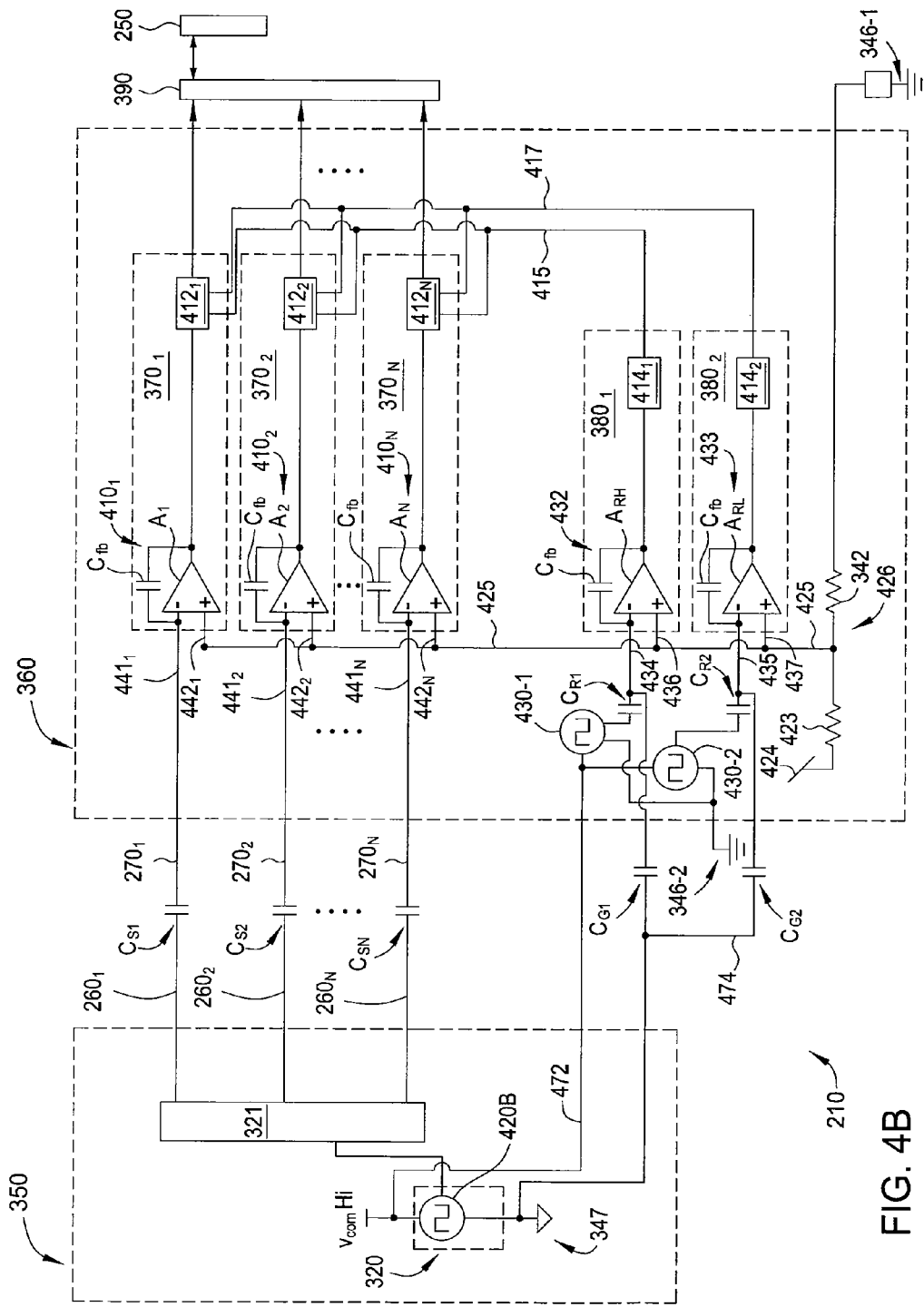
FIG. 4B is a schematic diagram illustrating one example of an input device according to one or more of the embodiments described herein.

FIGS. 4A and 4B are each a schematic view of a portion of the processing system 210 according to one or more of the embodiments described herein. As illustrated in FIGS. 4A and 4B, the processing system 210 may comprise a display processor 350 and a sensor processor 360 that work together to provide receiver channel output signals to the analysis module 390 and/or the electronic system 250. In one embodiment, sensor processor 360 comprises at least a portion of analysis module 390. As discussed above, the positional information of an input object 240 is derived based on the capacitance $C_s$ (e.g., capacitance $C_{S1}, C_{S2}, \ldots C_{SN}$) measured between each of the transmitter electrodes 260 (e.g., transmitter electrodes $260_1$, $260_2$, ... $260_N$) and the receiver electrodes 270 (e.g., receiver electrodes $270_1$, $270_2$, ... $270_N$).

In one embodiment, as shown in FIGS. 4-7, the display processor 350 comprises the drive voltage supply 320 and a driver 321, which are adapted to deliver capacitive sensing signals (transmitter signals) and display updating signals to the common electrodes of the transmitter electrodes 260 (e.g., transmitter electrodes $260_1$, $260_2$, ... $260_N$). In one configuration, as illustrated in FIGS. 4-7, the drive voltage supply 320 may comprise a power supply and signal generator 420B that is configured to deliver a square, rectangular, trapezoidal, sinusoidal, Gaussian or other shaped waveform to the transmitter electrodes 260. In one configuration, the signal generator 420B comprises an electrical device, or simple switch, that is able to deliver a transmitter signal that transitions between the output level of the power supply and a low display voltage level, such as the voltage level of point 322 (FIG. 3A) coupled to the display processor ground 347. In various embodiments, signal generator 420B may comprise an oscillator. In various other embodiments, signal generator 420B is clocked from an external source. In yet further embodiments signal generator 420B may comprise one or more pull-up and/or pull-down transistors, such as field-effect transistors or the like. In some configurations, one or more resistors (not shown), active circuit elements (not shown) or power supplies (not shown) may be disposed between point 322 and display processor ground 347 to adjust the low voltage level over which the provided transmitter signal varies during the capacitive sensing operation. In some embodiments, the low display voltage level is between the output level of the power supply and display processor ground 347. In some configurations, the signal generator 420B is integrated into the driver 321, which includes one or more shift registers and/or switches that are adapted to sequentially deliver display updating signals and transmitter signals to one or more of the transmitter electrodes (or common electrodes) at a time. In some configurations, the display processor 350 may also comprise a plurality of connectors (not shown), that are configured to transmit signals to and from the display processor 350.

In one embodiment, as shown in FIGS. 4-7, the sensor processor 360 comprises a plurality of receiver channels 370 (e.g., receiver channels $370_1$, $370_2$, ... $370_N$) that each have a first input port 441 (e.g., ports $441_1$, $441_2$, ... $441_N$) that is configured to receive the resulting signal received with at least one receiver electrode 270 (e.g., receiver electrode $270_1$, $270_2$, ... $270_N$), a second input port (e.g., ports $442_1$, $442_2$, ... $442_N$) that is configured to receive a sensor processor reference signal delivered through the line 425, and an output port coupled to the analysis module 390 and electronic system 250. Each of the plurality of receiver channels 370 may include a charge accumulator 410 (e.g., charge accumulators $410_1$, $410_2$, ... $410_N$), supporting components 412 (e.g., components $412_1$, $412_2$, ... $412_N$) such as demodulator circuitry, a low pass filter, sample and hold circuitry, other useful electronic components filters and analog/digital converters (ADCs) or the like. The analog/digital converter (ADC) may comprise, for example, a standard 8, 12 or 16 bit ADC that is adapted to receive an analog signal and deliver a digital signal (receiver channel output signal) to the analysis module 390. In one configuration, the charge accumulator 410 includes an integrator type operational amplifier (e.g., Op Amps $A_1$-$A_N$) that has an integrating capacitance $C_{fb}$ that is coupled between the inverting input and the output of the device. In other configurations, the charge accumulator 410 includes a current conveyer. In some configurations of the charge accumulator 410, a switch (not shown) or resistor (not shown) may be put in parallel with the integrating capacitance $C_{fb}$ to discharge it at a desired time during the capacitive sensing process. The analog/digital converter (ADC) may comprise, for example, a standard 8, 12 or 16 bit ADC that is adapted to receive an analog signal and deliver a digital signal (receiver channel output signal) to the analysis module 390. In some configurations, the sensor processor 360 may also comprise a plurality of connectors, not shown that are configured to transmit signals to and from the sensor processor device 360.

In one embodiment, as shown in FIGS. 4-7, the sensor processor 360 may further comprise a plurality of reference channels 380 (e.g., reference channels $380_1$, $380_2$) that each have a first input port 434, 435 that is configured to receive a reference channel input signal that may be coupled to the drive voltage supply 320, a second input port 436, 437 that is configured to receive the sensor processor reference signal, and an output port 415, 417, respectively, that are coupled to ADCs found in the supporting components 412, analysis module 390 and/or electronic system 250. Each of the plurality of reference channels 380 may have a capacitor (e.g., input capacitor $C_{R1}$ or $C_{R2}$) that is coupled to the first input port (e.g., ports 434, 435), and is sized to adjust the desired reference channel output signal that each reference channel 380 will deliver to one or more of the ADCs found in the supporting components $412_1$-$412_N$ and/or the analysis module 390. For example, in one embodiment, the reference channel output signal may be one of a high reference level signal and a low reference level signal. The span between different reference level outputs can thus be used as a reference that the resulting signals processed by the receiver channels 370 can be compared against during the touch sensing operation. While multiple reference channels are shown, various embodiments may comprise a single reference channel.

Each of the plurality of reference channels 380 (e.g., reference channels $380_1$ and $380_2$) may include a charge accumulator 432, 433, supporting components $414_1$, $414_2$, which in some configurations the supporting components may comprise demodulator circuitry, a low pass filter, sample and hold circuitry, other useful electronic components filters and analog/digital converters (ADCs) or the like. In one configuration, the charge accumulator 432, 433 includes an integrator type operational amplifier (e.g., Op Amps $A_{RH}$-$A_{RL}$) that has an integrating capacitance $C_{fb}$ that is coupled between the inverting input and the output of the device. In other configurations, the charge accumulator 410 includes a current conveyer. In some configurations of the charge accumulator 432, 433, a switch (not shown) or resistor (not shown) may be put in parallel with the integrating capacitance $C_{fb}$ to discharge it at a desired time during the process. In some embodiments the reference channels may be configured to deliver a reference channel output signal to one or more of the supporting components $414_1$-$414_N$ found in the receiver channels $380_1$-$380_N$ and/or the analysis module 390.

First Input Device Example

In some embodiments of the processing system 210, as shown in FIG. 4A, a resistive divider 426 is used to adjust the reference level of the sensor processor reference signal delivered to the second input ports 372 (e.g., ports $442_1$, $442_2$, ... $442_N$) of the receiver channels 370 and/or second input ports 436, 437 of the reference channel(s) 380. In various embodiments, the resistive divider 426 comprises a first resistor 423, which is coupled to a power supply 424 at one end and a resistor 342, as discussed above, that is coupled to system ground 346. In this configuration the power supply 424 can adjust the reference level of the sensor processor reference signal delivered to the receiver channels 370 and reference channels 380. It should be understood that the reference can be provided in other ways such as, for example, a more complex resistor string, a buffered voltage or a digital-to-analog converter. In one configuration, a power source may be disposed between the system ground 346 and the sensor processor 360 to adjust the reference level of the sensor processor reference signal delivered to the second input ports 372 and/or second input ports 436,437. In embodiments where multiple power sources are discussed, a single power source may be configured to perform the functions assigned to each of the multiple power sources. In some configurations, as shown in FIGS. 4A-4B and 7A-7B, the system ground 346 may comprise a first system ground 346-1 and a second system ground 346-2. In one configuration, the first system ground 346-1 and the second system ground 346-2 are connected to the same ground, and are thus at the same potential relative to each other. In another configuration, the first system ground 346-1 and the second system ground 346-2 are connected to different grounds that are maintained at different potentials relative to each other.

Referring to FIGS. 4A and 4B, in one embodiment of the processing system 210, the first input ports $441_1$-$441_N$, are ohmically coupled to the receiver electrodes $270_1$-$270_N$. In addition to the transmitter signal, interference on the display processor reference signal may couple from the transmitter electrodes ($260_1$-$260_N$) into the receiver electrodes $270_1$-$270_N$. As such, resulting signals received at an input port(s) $441_N$ with a sensor electrode may comprise effects corresponding to the electrical interference at least partially based on the difference in reference signals between display processor 350 and the sensor processor 360. Therefore, in one embodiment, as shown in FIG. 4A, the second input ports $442_1$-$442_N$ of the receiver channels 370 are referenced to the display processor 350's display reference signal. In another embodiment, as shown in FIG. 4B, the second input ports $442_1$-$442_N$ of the receiver channels 370 are referenced to the sensor processor signal and the first input ports 434 and 435 of reference channels $380_1$ and $380_2$ are coupled to the display processor reference signal through capacitors $C_{G1}$ and $C_{G2}$. In such an embodiment, any interference that is present at the display processor reference voltage is coupled to the input port of each reference channel, such that they reference channel output signal comprises effects corresponding to that interference. The reference channel output signal may then be used by the receiver channel 370 to substantially eliminate any similar interference in the received resulting signals. This allows the charge accumulators to $410_1$-$410_N$ to substantially cancel out the interference coupled from the display device into the receiver electrodes.

Referring to FIGS. 4A and 4B, in one embodiment, the processing system 210 comprises a reference channel 380 configuration in which signal generators 430-1 and 430-2 drive the first input ports 434,435 (respectively) of the reference channels 380, wherein the signal generators 430-1 and 430-2 are supplied by the drive voltage supply 320 through the line 472. In this configuration, the signal generator 430 is configured to provide a reference channel input signal waveform to each of the input capacitors $C_{R1}$,$C_{R2}$ connected to the first input ports 434,435 of the charge accumulators 432,433, respectively. In various embodiments, the reference channel input signal is a modulated signal that transitions between a first reference voltage level and a second reference voltage level. In one example, the reference channel input signal is a square wave that transitions between the voltage level delivered from the drive voltage supply 320 ($V_{TX}$) and the signal processor reference signal based on the display processor reference signal. Therefore changes in the diver voltage supply 320 will be tracked by the reference channels in the sensor processor. In one embodiment, the display processor reference signal is based on the display processor ground. In another embodiment, signal generators 430 are referenced to the system ground 346. The received reference channel input signal is then processed by the circuitry in each of the reference channels $380_1$, $380_2$ to provide reference channel output signals that track the interference affected signal provided by the drive voltage power supply 220A, so that the interference affected reference channel output signal can then be compared with the at least partially processed receiver channel output signals created by the receiver channels $370_1$-$370_N$, which have also received the interference affected signal from the drive voltage power supply 220A. In the embodiment illustrated in FIG. 4B, each reference channel input signal is based on a modulated signal from signal generators 430-1 and 430-2 (respectively) and the display processor reference signal biased by $C_{G1}$ and $C_{G2}$. In such an embodiment, any interference present within the display processor reference signal will be present at the reference channel input signal, and the reference channel output signals will comprise effects corresponding to that interference. In various embodiments, $C_{G1}$ and $C_{G2}$ may be substantially similar to a capacitive coupling that exists between the sensor electrodes (transmitter electrodes 260 and receiver electrodes 270) and the display device. In one embodiment, while multiple signal generators are illustrated in FIGS. 4A and 4B, a single signal generator may be implemented, the output of which is coupled to each of the reference channels. Further, while capacitors $C_{G1}$ and $C_{G2}$ are illustrated as being external to sensor processor 360, however, in other embodiments, one or both capacitors $C_{G1}$ and $C_{G2}$ may be internal to sensor processor 360. Further, while two capacitors, capacitors $C_{G1}$ and $C_{G2}$, are illustrated, in other embodiments, only a single capacitor may be implemented. In one embodiment, since the receiver channel output signal(s) are compared with a reference channel output signal that is similarly affected by the injection of interference, a reliable analog-to-digital converted signal with interference substantially cancelled out can be delivered to the analysis module 390 to provide reliable, or interference minimized, positional information to the host components. For example, the reference channel output signal(s) may be used to set the voltage range of one or more elements of the receiver channel (e.g., an analog-to-digital converter, or the like), reducing the interference due to the differences between the display processor and sensor processor reference signals. In one embodiment, the reference channel $380_1$ is configured to deliver a reference channel high output voltage level (RHOL) to the analysis module 390 and the reference channel $380_2$ is configured to deliver a reference channel low output voltage level (RLOL) to the analysis module 390, where the difference between the reference channel high output voltage level and the reference channel low output voltage level spans substantially the same range as the transmitter signal used for capacitive sensing. Therefore, with the use of the combination of the sensor processor reference signals provided to the receiver channels 370 and the reference channel output signals the interference generated by the drive voltage supply 320 can be accounted for and its affect can be reduced. It should be noted that having only a single reference channel is also possible, or deriving both RHOL and RLOL from a single reference channel is possible.

Second Input Device Example

Figure 5A:
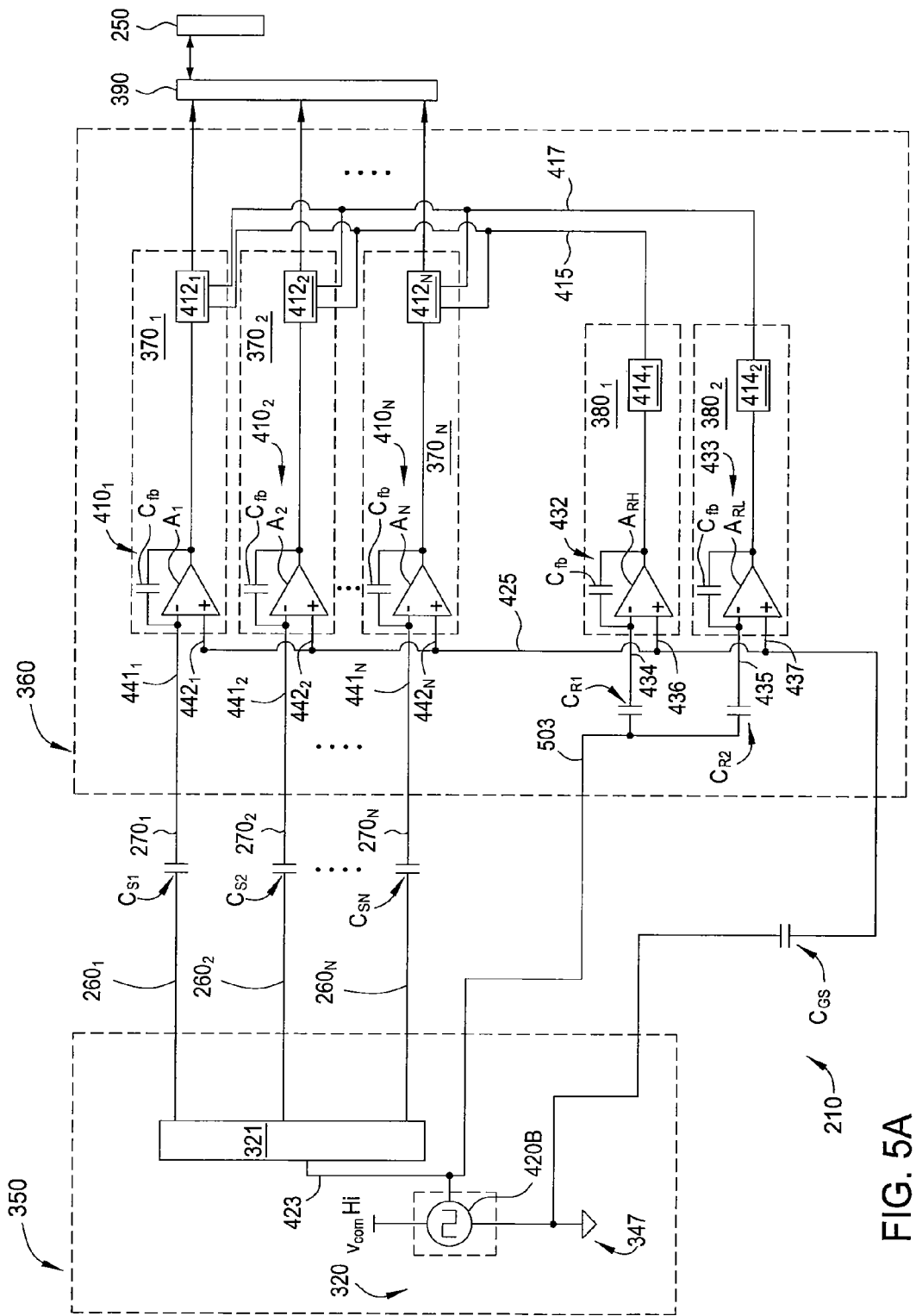
FIG. 5A is a schematic diagram illustrating one example of an input device according to one or more of the embodiments described herein.
Figure 5B:
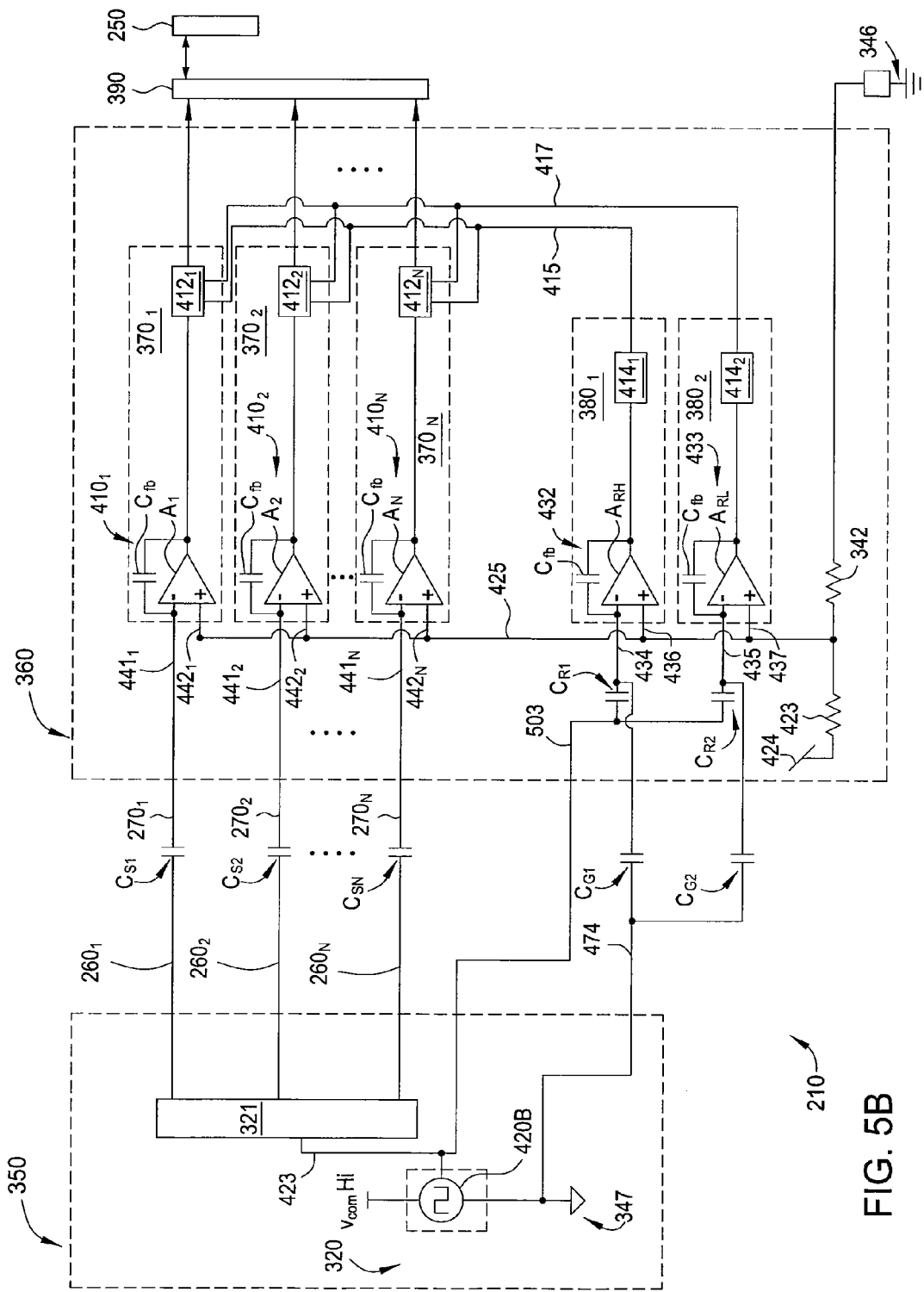
FIG. 5B is a schematic diagram illustrating one example of an input device according to one or more of the embodiments described herein.

FIGS. 5A and 5B are each a schematic view of at least a portion of the processing system 210 of the input device 200 according to another embodiment of the invention described herein. As illustrated in FIGS. 5A and 5B, the processing system 210 may comprise a display processor 350 and a sensor processor 360 that work together to provide input sensing data to an analysis module 390 and/or electronic system 250. One will note that the components that are similarly numbered and configured, as shown in FIGS. 3-5, and thus are not re-discussed herein.

In one embodiment, as discussed above, a sensor processor reference signal can be formed by capacitively coupling the second input ports $442_1$-$442_N$ of the receiver channels 370 to the display processor ground 347 of the display processor 350. In some configurations, a system capacitance $C_{GS}$ couples the second input ports $442_1$-$442_N$ and the display processor ground 347 of the display processor 350. Alternatively, the AC coupling capacitor, or the system capacitance $C_{GS}$, could be internal to 360. In other configurations, as illustrated in 5B, the display processor reference signal may be AC coupled ($C_{G1}$ and $C_{G2}$) to the input of each of the reference channels, such that each reference channel input signal is based, at least in part, on the interference within the display processor reference signal. Further, in such configurations, the reference channel output signals comprise effects corresponding to the interference within the display processor reference signal. The AC coupling may be internal to, or external to the sensor processor or the display processor. One will note, as is described above, the resulting signals received with each of the receiver electrodes $270_1$-$270_N$ and the first input ports $441_1$-$441_N$ may include interference created by the difference between the display processor reference the sensor processor reference. As illustrated in FIG. 5A, the display processor system ground is provided to each reference input for each receiver channel and reference channel.

Referring to FIG. 5A, in one embodiment, the processing system 210 further comprises a reference channel 380 configuration in which the first input port(s) 434, 435 of the reference channel(s) 380 are directly coupled to the output of the drive voltage supply 320. In this configuration, the transmitter signal delivered from the drive voltage supply 320 is delivered to one or more of the transmitter electrodes 260 (and one or more common electrodes) and also provided as a reference channel input signal coupled through the input capacitors $C_{R1}$, $C_{R2}$ (a first and second capacitor reference) of the first input ports 434, 435, respectively, through line 503. In one embodiment, the drive voltage supply may be provided as a reference channel input signal coupled through an AC coupling that is external to the sensor processor 360. The received reference channel input signal is then processed by the circuitry in each of the reference channels $380_1$, $380_2$ to provide an reference channel output signal by each of the reference channels $380_1$, $380_2$, which may be used by one or more receiver channels 370 (receiver channels $370_1$-$370_N$), analysis module 390 and/or electronic system 250 to substantially reduce interference due to differences between the display processor reference and the sensor processor reference. In one embodiment, the reference channel output signal(s) may be used to set the voltage range of one or more elements of the receiver channel (e.g., an analog-to-digital converter, or the like). In this way, changes in or interference on the display drive voltage may tracked by the sensor processor reference channels.

Referring to FIG. 5B, in one embodiment, the processing system 210 further comprises a reference channel 380 configuration in which the first input port(s) 434, 435 of the reference channel(s) 380 are directly coupled to the output of the drive voltage supply 320 and AC coupled to the display processor reference voltage. In this configuration, the transmitter signal delivered from the drive voltage supply 320 is delivered to one or more of the transmitter electrodes 260 (and one or more common electrodes) and also provided as a reference channel input signal coupled through the input capacitors $C_{R1}$, $C_{R2}$ (a first and second capacitor reference) of the first input ports 434, 435, respectively. Further, the display processor reference signal is coupled to the first input ports 434 and 435 through capacitors $C_{G1}$ and $C_{G2}$, as illustrated in FIG. 5B. While capacitors $C_{G1}$ and $C_{G2}$ are illustrated as being external to sensor processor 360, however, in other embodiments, one or both capacitors $C_{G1}$ and $C_{G2}$ may be internal to sensor processor 360. Further, while two capacitors, capacitors $C_{G1}$ and $C_{G2}$, are illustrated, in other embodiments, only a single capacitor may be implemented. In one embodiment, the drive voltage supply may be provided as a reference channel input signal coupled through an AC coupling that is external to the sensor processor 360. The received reference channel input signal is then processed by the circuitry in each of the reference channels $380_1$, $380_2$ to provide an reference channel output signal by each of the reference channels $380_1$, $380_2$, which may be used by one or more receiver channels 370 (receiver channels $370_1$-$370_N$), analysis module 390 and/or electronic system 250 to substantially reduce interference due to differences between the display processor reference and the sensor processor reference. In one embodiment, the reference channel output signal(s) may be used to set the voltage range of one or more elements of the receiver channel (e.g., an analog-to-digital converter, or the like). In this way, changes in or interference on the display drive voltage may tracked by the sensor processor reference channels.

Third Input Device Example

Figure 6A:
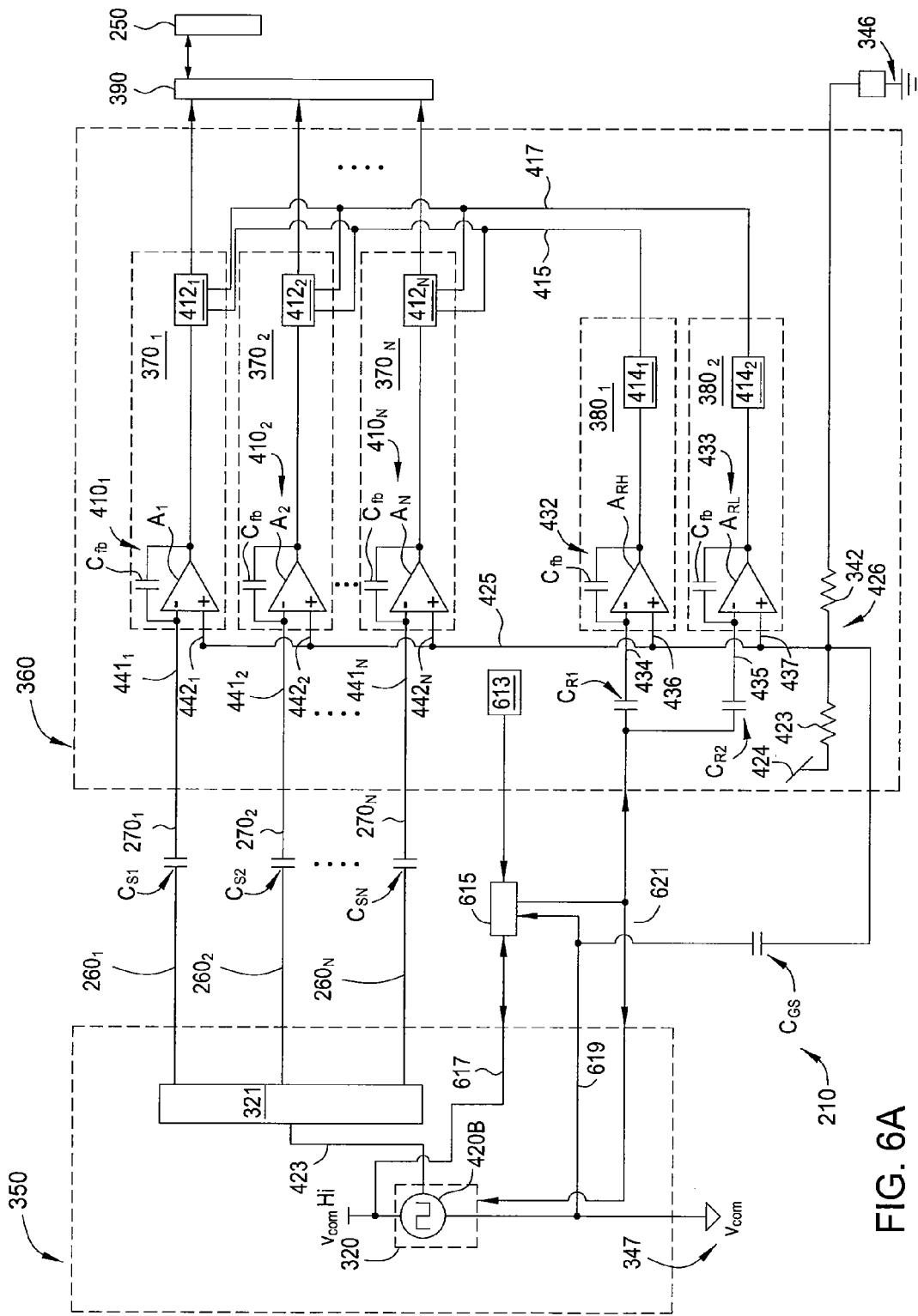
FIG. 6A is a schematic diagram illustrating one example of an input device according to one or more of the embodiments described herein.
Figure 6B:
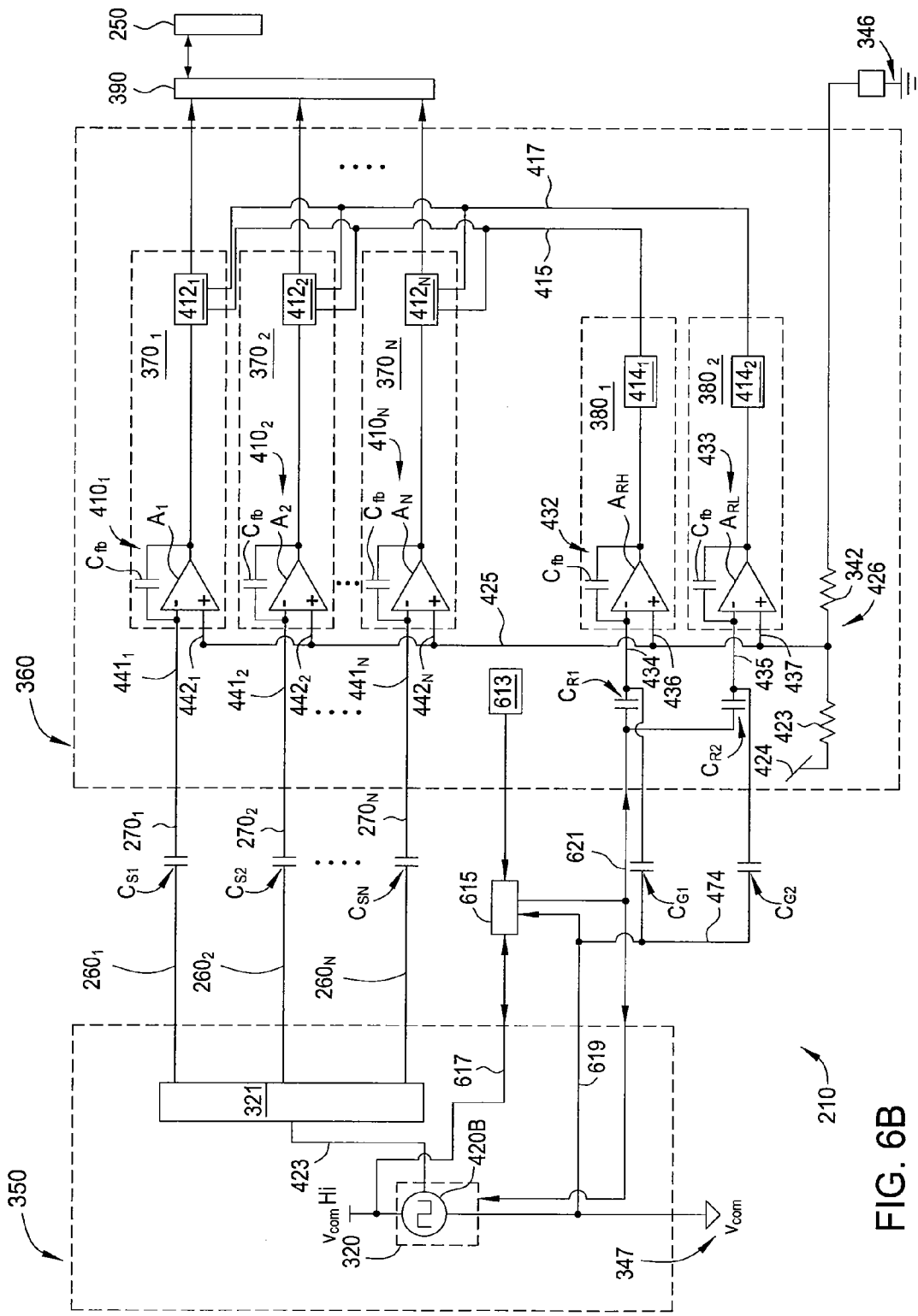
FIG. 6B is a schematic diagram illustrating one example of an input device according to one or more of the embodiments described herein.
Figure 7A:
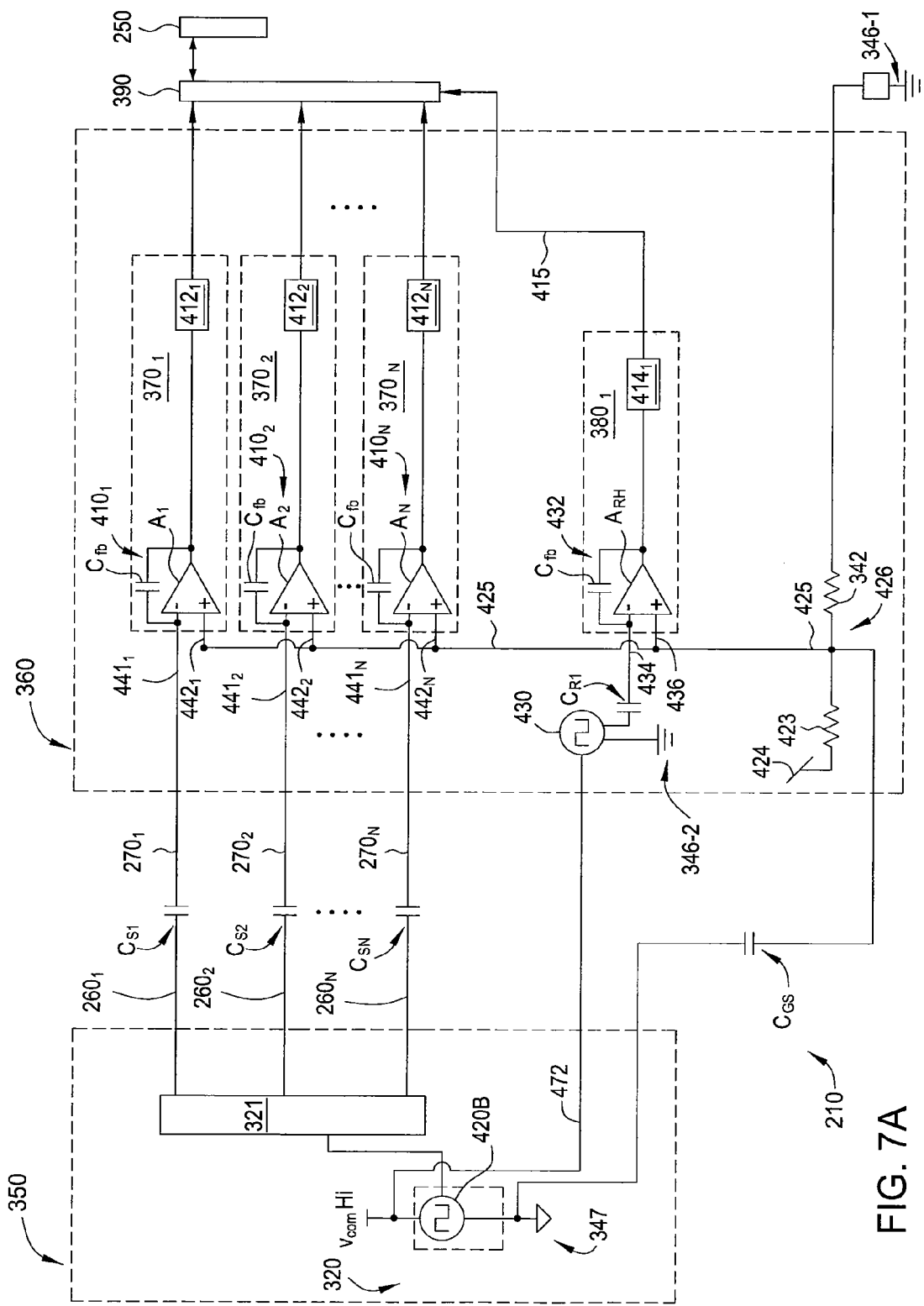
FIG. 7A is a schematic diagram illustrating one example of an input device according to one or more of the embodiments described herein.

FIGS. 6A and 6B are each a schematic view of a portion of the processing system 210 of the input device 200 according to another embodiment of the invention described herein. As illustrated in FIGS. 6A and 6B, the processing system 210 may comprise a display processor 350 and a sensor processor 360 that work together to provide input sensing data to an analysis module 390 and/or electronic system 250. One will note that the components that are similarly numbered and configured, as shown in FIGS. 3-5, will not be re-discussed herein.

In one embodiment, as discussed above and shown in FIG. 6A, a sensor processor reference signal can be formed by coupling the second input ports $442_1$-$442_N$ of the receiver channels 370 to the display processor ground 347 of the display processor 350. In some configurations, as illustrated in FIGS. 4-7, a system capacitance $C_{GS}$ couples the second input ports $442_1$-$442_N$ and the display processor ground 347 of the display processor 350. In one embodiment, system capacitance $C_{GS}$ may be internal to sensor processor 360. In other configurations, as illustrated in 6B, the display processor reference signal may be AC coupled ($C_{R1}$ and $C_{R2}$) to the input of each of the reference channels through line 621, such that each reference channel input signal is based, at least in part, on the interference within the display processor reference signal. Further, in such configurations, the reference channel output signals comprise effects corresponding to the interference within the display processor reference signal. The AC coupling may be internal to, or external to the sensor processor or the display processor. One will note, as is described above, the resulting signals received with each of the receiver electrodes $270_1$-$270_N$ and the first input ports $441_1$-$441_N$ may include interference created by the difference between the display processor reference the sensor processor reference.

In one embodiment, as illustrated in FIGS. 6A and 6B, the processing system 210 may further comprise an external triggering device 613 and a level shifter 615 that are used to coordinate transmitter signals from the display processor 350 with the sensing operation of the sensor processor 360. In one embodiment, the external triggering device 613 is used to control the timing of the capacitive sensing operation by delivering communication signals, such as triggering waveforms or triggering pulses that are received by the drive voltage supply 320, and trigger the drive voltage supply 320 to sequentially deliver transmitter signals in a synchronized manner to the transmitter electrodes $260_1$-$260_N$. In some configurations, as shown in FIGS. 6A and 6B, the triggering pulses that are delivered to the drive voltage supply 320 are provided from the level shifter 615 that is configured to provide triggering pulses that are at a voltage level and/or voltage range that differs from the voltage level and/or voltage range of the signal (e.g., a sensor processor transmitter signal or sensor processor triggering signal) provided by the external triggering device 613. In some configurations, the triggering pulses that are delivered to the drive voltage supply 320 are provided directly from the external triggering device 613, which is configured to provide a signal that is at a voltage level and/or voltage range that differs from the voltage level and/or voltage range of the capacitance sensing signal provided by the drive voltage supply 320.

In various embodiments, the level shifter 615 is configured to receive the triggering pulses from the external triggering device 613, and provide a voltage level shifted output signal that is used by the charge accumulators 432, 433 of the reference channels $380_1$, $380_2$ to create reference channel output signals that are used by the receiver channels $370_1$-$370_N$, the analysis module 390 and/or electronic system 250 components. In one embodiment, the high output level of the reference channel input signal, which is delivered to the input ports 434, 435 of the charge accumulators 432, 433, is set by the input signal provided to the level shifter 615 from the output of the power supply. Further, the low output level of the reference channel input signal, which is received at the input ports 434, 435, can be based on the display processor reference signal, which may be coupled to the level shifter 615 and the display processor ground 347. In one embodiment, the received reference channel input signal is processed by the circuitry in each of the reference channels $380_1$, $380_2$ to provide an reference channel output signal by each of the reference channels $380_1$, $380_2$, which may be used by one or more receiver channels 370 (receiver channels $370_1$-$370_N$), analysis module 390 and/or electronic system 250 to substantially reduce interference due to differences between the display processor reference and the sensor processor reference. In one embodiment, the reference channel output signal(s) may be used to set the voltage range of one or more elements of the receiver channel (e.g., an analog-to-digital converter, or the like), reducing the interference due to the differences between the display processor and sensor processor reference signals.

During a capacitive sensing interval performed by the input device 200, the external triggering device 613 is configured to deliver a series of pulses that vary between a first voltage level and a second voltage level to the level shifter 615. In one example, the first voltage level is less than about 5 volts and the system ground (e.g., level of point 346 (FIG. 3A)). The level shifter 615 then adjusts the level of the received signal from the external triggering device 613 based on the high and low output level and provides a triggering signal to the drive voltage supply 320 and a level adjusted signal to the input ports 434, 435 of the reference channels $380_1$, $380_2$. In one example, the high output level 617 supplied by the drive voltage supply 320 may have a magnitude of between 1 and 15 volts. In other embodiments, the low output level supplied on line 619 (which is the display processor reference signal) may have a magnitude of less than 1 volt. In other embodiments, the high output level supplied on line 617 by the drive voltage supply 320 may have a magnitude of greater than 15 volts. The triggering signal received by the drive voltage supply 320 cause the drive voltage supply 320 to deliver transmitter signal(s) to the transmitter electrodes $260_1$-$260_N$, which is then received and processed by the receiver channels $370_1$-$370_N$ with receiver electrodes $270_1$-$270_N$. The reference channel output signal(s), formed by the reference channels $380_1$, $380_2$, can then be used by receiver channels $370_1$-$370_N$ to provide reliable receiver channel output signals to the analysis module 390 and host components.

Fourth Input Device Example

Figure 7B:
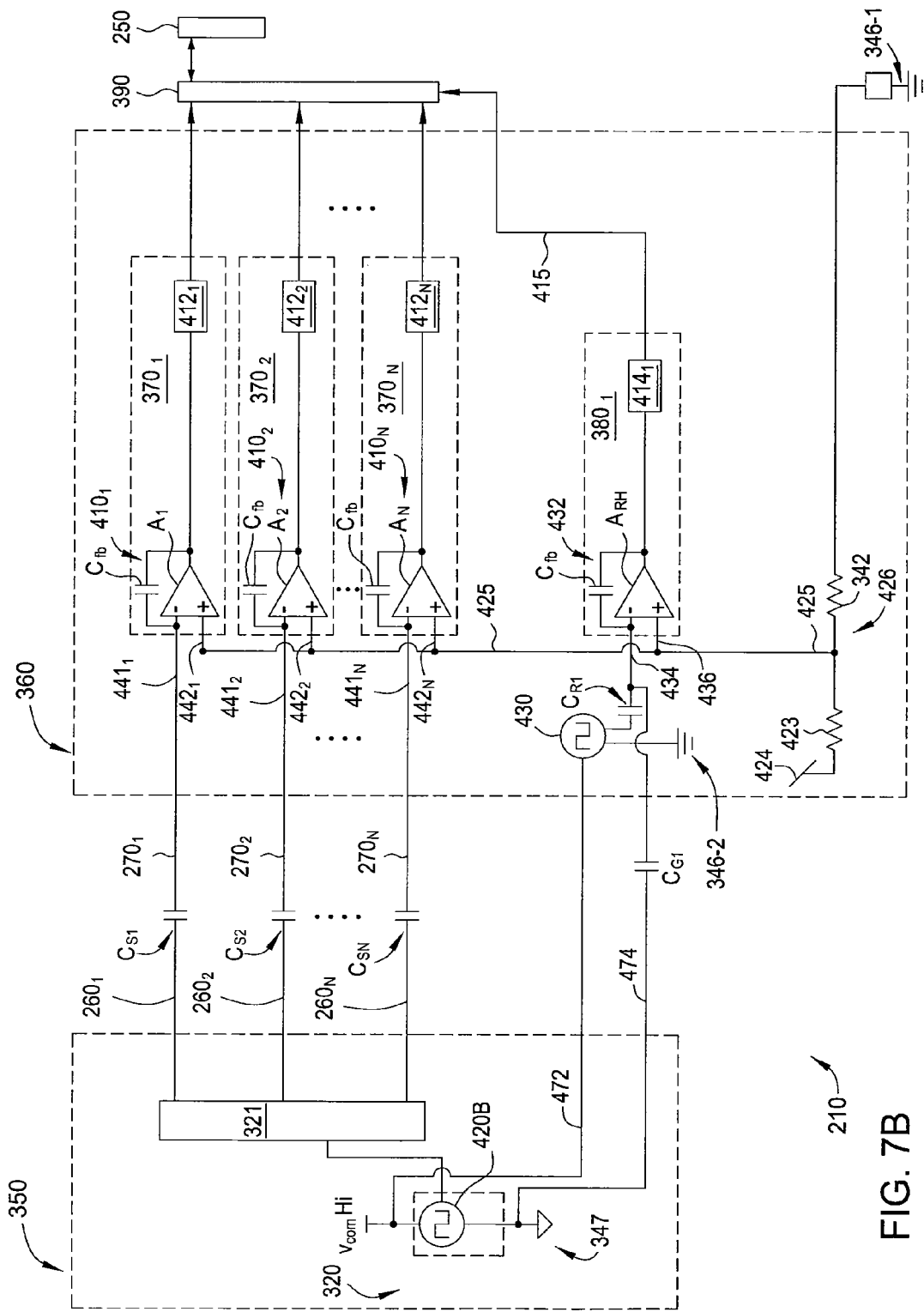
FIG. 7B is a schematic diagram illustrating one example of an input device according to one or more of the embodiments described herein.

FIGS. 7A and 7B each are a schematic view of a portion of the processing system 210 of the input device 200 according to another embodiment of the invention described herein. The embodiments illustrated in FIGS. 7A and 7B are each similar to FIGS. 4A and 4B, except that the reference channel output signal of the reference channel 380 is provided to the analysis module 390 and/or the electronic system 250, which then compares the received reference channel output signal with the of received the receiver channel(s) 370 signal(s) to determine at least a portion of the positional information of the input object. While one reference channel 380 is shown, in other embodiments, multiple reference channels may be employed. In various embodiments, reference channel 380 may further comprise circuitry elements that are adapted to deliver a digital form of the reference channel output signal to the analysis module 390, such as at least an analog/digital converter (ADC), or the like.

In one embodiment, the analysis module 390 and/or the electronic system 250 is configured to correct the measured capacitance, such as one of the capacitances $C_S$, based on the resulting signal received from the receiver channel 370, and use the corrected capacitance value to determine the positional information of an input object 240 in the sensing region 220 of the input device 200. In this case, the reference channel output signal delivered from the reference channel 380 is used to form the corrected capacitance value, which is then used to determine the presence of an input object 240. During operation, in one embodiment, a measured capacitance $C_S$ at an instant in time $t_1$, such as a measured capacitance $C_{S1}$ at time $t_1$, is multiplied by a correction factor, which is determined by dividing a reference channel output signal taken at the time $t_1$ by a reference channel output signal taken at a time $t_0$ (e.g., a reference channel output signal taken at a prior instant in time or a stored baseline value). In the illustrated embodiment, the magnitude of the reference channel output signal received from a reference channel 380 is based on the fixed capacitance of the input capacitor $C_R$ and the voltages of the drive signal provided by power supply 320. In one embodiment, which comprises more than one reference channel and reference capacitance, the multiple reference capacitances may be used to correct the sensed capacitance at any instant in time to determine the positional information of an input object 240. In one example, the measured capacitance of each reference channel is corrected by taking the ratio of the reference channel output signals at any instants in time.

While a configuration of the processing system 210 that includes the delivery of the reference channel output signals to the analysis module 390 and/or electronic system 250 is described and illustrated herein in conjunction with FIGS. 4A and 4B, this configuration is not intended to be limiting as to the scope of the invention described herein, since any of the configurations disclosed herein, such as the ones discussed in conjunction with FIGS. 3-6, could utilize this reference channel configuration. For example, the embodiments of FIGS. 7A and 7B may comprise level shifters as described in relation with FIGS. 6A and 6B. Further, while the embodiments illustrated in FIGS. 7A and 7B are illustrated as having a signal generator 430, in either embodiment, $C_{R1}$ may be coupled with the output of signal generator 420B as is illustrated in FIGS. 5A and 5B.

Further, while the above embodiments may describe transcapacitive sensing embodiments, in various embodiments, input device 200 may be configured to sense changes in absolute capacitance. In such embodiments, sensed capacitance "$C_s$" may be formed between a sensor electrode and an input object. In such embodiments, a transmitter electrode, driven by the display processor, is not capacitively coupled to a receiver electrode. To state it another way, in absolute capacitance sensing embodiments, a sensor electrode is driven and received with simultaneously. In one embodiment, with reference to FIGS. 3A, 4A, 5A and 6A, reference channel input port 384 may be coupled a sensor processor reference signal 346 which may be based on a display processor reference signal (e.g., display processor reference signal 347). Further, reference channel input port 383 may be capacitively coupled to sensor processor reference signal 346 (or some other reference signal of input device 200) through a reference capacitance ($C_R$). In such embodiments, line 381 or 472 may comprise a capacitive coupling to sensor processor reference signal 346 instead of the drive voltage supply 320. With reference to FIGS. 3B, 4B, 5B and 6B, reference channel 380 comprises input connection 395 that is capacitively coupled to a display processor reference voltage (e.g., display processor reference signal 347, Vcom, etc.) through connection 343-2, and reference channel input port 383 that is capacitively coupled to sensor processor reference signal 346 (or some other reference signal of the input device 200) through 381. In such an embodiment, line 381 may be capacitive coupled to sensor processor reference signal 346 (or some other reference signal of input device 200) through a reference capacitance ($C_R$). In the embodiments illustrated in FIGS. 4B, 5B, and 6B, the connection 343-2 and input connection 395 (e.g., reference numeral 474 in FIGS. 4B, 5B, 6B and 7B) are coupled to the first input port (i.e., input port 383) of reference channel 380, thereby providing the display reference signal to the first input port. Any interference that is present on the display processor reference signal may be coupled into the reference channel, providing a reference channel output signal that comprises the interference, which may be used to substantially minimize the effects of that interference on the resulting signals received by the receiver channel(s) 370. The embodiments illustrated in FIGS. 7A and 7B may also be configured to operate for absolute capacitive sensing, as described above. As is described above, in the embodiments illustrated in FIGS. 7A and 7B, the reference channel output signal(s) is provided to analysis module 390 along with the receiver channel output signals. Analysis module 390 is configured to process the receiver channel output signals and the reference channel output signals to substantially remove any interference due to the display processor reference signal present in the receiver channel output signal(s).

Further, while in the above description and related figures, the display processor is described as being configured to drive the common electrodes for capacitive sensing and display updating, in various embodiment the above interference mitigation techniques may be applied to a system where the display processor is configured to drive the common electrodes for display updating and a separate processor (e.g. the sensor processor, etc.) may be configured to drive a plurality of transmitter electrodes for capacitive sensing. In such an embodiment, the transmitter electrodes are separate from the common electrodes. Further, at least part of driver 321 may be present in sensor processor 360. In such an embodiment, while the display driver may not be configured to drive the transmitter electrodes for capacitive sensing, the above techniques of coupling the display reference signal to the reference channel(s) and/or to the sensor processor reference signal may be applied (as is described related to FIGS. 3-7).

The embodiments and examples set forth herein were presented in order to best explain the present technology and its particular application and to thereby enable those skilled in the art to make and use the present technology. Those skilled in the art will recognize that the foregoing description and examples have been presented for the purposes of illustration and example only. The description as set forth is not intended to be exhaustive or to limit the present technology to the precise form disclosed. While the foregoing is directed to embodiments of the present invention, other and further embodiments of the invention may be devised without departing from the basic scope thereof, and the scope thereof is determined by the claims that follow.

The invention claimed is:

1. An input device, comprising:
    a plurality of transmitter electrodes comprising a plurality of common electrodes configured to operate in a first mode for capacitive sensing and configured to operate in a second mode for updating a display device;
    a plurality of receiver electrodes;
    a display processor coupled to the plurality of transmitter electrodes and configured to drive at least one of the transmitter electrodes with a transmitter signal for capacitive sensing; and
    a sensor processor coupled to the plurality of receiver electrodes and configured to receive resulting signals with the plurality of receiver electrodes when at least one of the common electrodes are driven for capacitive sensing, wherein the sensor processor comprises one or more receiver channels, and wherein each of the one or more receiver channels is coupled to a receiver electrode of the plurality of receiver electrodes, and each of the one or more receiver channels have:
        a first receiver channel input port configured to receive at least a portion of the resulting signals; and
        a second receiver channel input port configured to receive a sensor processor reference signal that is based on a display processor reference signal,
    wherein each of the one or more receiver channels is configured to provide an output signal based on a comparison of the at least a portion of the resulting signals and the sensor processor reference signal.

2. The input device of claim 1, wherein each of the one or more receiver channels comprises a charge accumulator, wherein the second receiver channel input port is coupled to a reference input of the charge accumulator.

3. The input device of claim 1, wherein the display processor reference signal is configured to be electrically coupled to a ground of the sensor processor.

4. The input device of claim 1, wherein the sensor processor further comprises a reference channel configured to provide a reference channel output wherein the reference channel has a first reference channel input port that is configured to receive a reference channel input signal and a second reference channel input port that is in electrical communication with the second receiver channel input port and is configured to receive the sensor processor reference signal.

5. The input device of claim 4, wherein the sensor processor reference signal is based on at least one of the display processor reference signal and a second display processor reference signal.

6. The input device of claim 4, wherein the reference channel input signal is based on at least one of the display processor reference signal and a second display processor reference signal.

7. The input device of claim 4, wherein the reference channel input signal is based on the transmitter signal.

8. The input device of claim 7, wherein the transmitter signal is generated from a level shifter that translates a sensor processor transmitter signal into voltage levels based on at least one of the display processor reference signal and a second display processor reference signal.

9. A sensor processor for an input device, comprising:
a sensor circuitry coupled to a plurality of sensor electrodes, wherein the sensor processor is coupled to a display processor that is configured to drive a plurality of common electrodes for updating a display device, wherein the sensor processor comprises at least one receiver channel configured to receive resulting signals with at least one of the plurality of sensor electrodes and to receive a sensor processor reference signal that is based on a display processor reference signal, and wherein the receiver channel is further configured to provide an receiver channel output signal based on at least a portion of the received resulting signals and the sensor processor reference signal.

10. The sensor processor of claim 9, wherein the display processor reference signal is configured to be electrically coupled to a ground of the sensor processor.

11. The sensor processor of claim 9, wherein the sensor processor further comprises:
a reference channel that is configured to provide a reference channel output signal, wherein the reference channel is configured to receive a first signal based on the first display processor reference signal and wherein an output of the sensor processor is based on the receiver channel output signal and the reference channel output signal.

12. The sensor processor of claim 11, wherein the reference channel is further configured to receive a second signal based on a second display processor reference signal.

13. The sensor processor of claim 11, wherein the receiver channel is configured to provide the receiver channel output signal to an analog-to-digital converter and wherein the reference channel is configured to provide the reference channel output signal to the analog-to-digital converter, and wherein the output of the sensor processor that is based on the receiver channel output signal and the reference channel output signal comprises the output of the sensor processor being based on an output of the analog-to-digital converter.

14. The sensor processor of claim 9, wherein the display processor is further configured to drive the common electrodes for capacitive sensing comprising transmitting a transmitter signal with at least one of the common electrodes, and wherein the sensor processor comprises a reference channel that is configured to receive at least a portion of the transmitter signal and the sensor processor reference signal.

15. The sensor processor of claim 9, wherein the sensor processor further comprises a reference channel that has a first reference channel input port that is configured to receive a reference channel input signal and a second reference channel input port that is in electrical communication with the second receiver channel input port and is configured to receive the sensor processor reference signal, wherein the reference channel input signal is based on a transmitter signal that is generated from a level shifter that translates a sensor processor transmitter signal into voltage levels based on at least one of the display processor reference signal and a second display processor reference signal.

16. The sensor processor of claim 9, wherein the display processor is further configured to drive the plurality of common electrodes for capacitive sensing and wherein receiving resulting signals with the plurality of sensor electrodes comprises receiving resulting signals when the display processor drives the plurality of common electrodes for capacitive sensing.

17. The sensor processor of claim 9, wherein the sensor processor is further configured to drive the plurality of sensor electrodes for capacitive sensing, and wherein receiving resulting signals with the plurality of sensor electrodes comprises receiving the resulting signals with the plurality of sensor electrodes when the sensor processor drives the plurality of sensor electrodes for capacitive sensing.

18. A processing system for an input device, the processing system comprising:
a display processor configured to drive a plurality of common electrodes for updating a display device, the display processor comprising a display processor reference signal,
a sensor processor configured to receive resulting signals from a plurality of sensor electrodes, wherein the sensor processor comprises a first reference channel configured to generate a first reference channel output signal at least partially based on the display processor reference signal, wherein the processing system is configured to determine positional information for an input object in a sensing region of the input device at least based in part on the resulting signals and the first reference channel output signal.

19. The processing system of claim 18, wherein the display processor is further configured to drive the plurality of common electrodes for capacitive sensing comprising driving at least one of the plurality of common electrodes with a transmitter signal, wherein receiving resulting signals from a plurality of sensor electrodes comprises receiving a resulting signal when at least one of the plurality of common electrodes are driven with a transmitter signal, and wherein the first reference channel output signal is further generated based on the transmitter signal.

20. A processing system for an input device of claim 19, wherein the first reference channel is further configured to receive a first reference channel input signal based on at least part of the transmitter signal and the display processor reference signal.

21. The display processor of claim 20, wherein receiving the first reference channel input signal based on at least part of the transmitter signal wherein the transmitter signal is generated from a level shifter that translates a sensor processor transmitter signal into voltage levels based on at least one of the display processor reference signal and a second display processor reference signal.

22. The processing system of claim 18, wherein the display processor is further configured to drive the plurality of common electrodes for capacitive sensing comprising driving at least one of the plurality of common electrodes with a transmitter signal, wherein the transmitter signal comprises a waveform that transitions from a first voltage potential to a second voltage potential, wherein receiving resulting signals from a plurality of sensor electrodes comprises receiving a resulting signal when at least one of the plurality of common electrodes are driven with a transmitter signal, and wherein the first reference channel output signal is further generated based on a modulated signal that is based on the first voltage potential.

23. The processing system of claim 18, wherein the first reference channel is further configured to receive a first reference channel input signal based on at least part of a transmitter signal and a second reference channel input signal that is based on the display processor reference signal.

24. The processing system of claim 18, wherein the sensor processor comprises one or more receiver channels, and wherein each of the one or more receiver channels is coupled to a sensor electrode of the plurality of sensor electrodes, and each of the one or more receiver channels has:
a first receiver channel input port configured to receive at least a portion of the resulting signals; and
a second receiver channel input port configured to receive a sensor processor reference signal that is based in part on the display processor reference signal,
wherein each of the one or more receiver channels is configured to provide a receiver channel output signal based on a comparison of the signals received at the first receiver channel input port and the second receiver channel input port.

25. The processing system of claim 18, wherein the display processor reference signal is configured to be electrically coupled to a system ground of the sensor processor.

26. The processing system of claim 18, wherein the first reference channel is further configured to receive a first reference channel input signal that is based on a transmitter signal that is generated from a level shifter that translates a sensor processor transmitter signal into voltage levels based on at least one of the display processor reference signal and a second display processor reference signal.

27. The processing system of claim 18, wherein the sensor processor is further configured to drive the plurality of sensor electrodes for capacitive sensing, and wherein receiving the resulting signals from the plurality of sensor electrodes comprises receiving the resulting signals from the plurality of sensor electrodes when the plurality of sensor electrodes are driven for capacitive sensing.

28. The processing system of claim 27, wherein driving the plurality of sensor electrodes for capacitive sensing comprises driving the plurality of sensor electrodes with a signal comprising a waveform that transitions from a first voltage potential to a second voltage potential, and wherein the first reference channel is configured to receive a generated modulated signal that is based on the first voltage potential.

29. A method of sensing an input object in a sensing region of an input device, comprising:
driving a display update on at least one of a plurality of common electrodes, the common electrodes configured for capacitive sensing and updating a display device;
driving a transmitter signal onto at least one of a plurality of common electrodes;
receiving a resulting signal from one or more receiver electrodes, wherein the resulting signal comprises effects corresponding to the transmitter signal; and
comparing the resulting signal with a sensor processor reference signal that is based on a display processor reference signal.

30. The method of claim 29, wherein comparing the resulting signal with the sensor processor reference signal further comprises:
providing the resulting signal to a first input of a charge accumulator; and
providing the sensor processor reference signal to a second input of the charge accumulator, wherein the charge accumulator is configured to:
form a receiver channel output signal using the resulting signal and the sensor processor reference signal; and
output the receiver channel output signal to a host system for sensing the presence of an object near the one or more receiver electrodes.

31. The method of claim 29, wherein comparing the resulting signal with the sensor processor reference signal further comprises:
providing the resulting signal to a receiver channel;
providing the display processor reference signal to a reference channel; and
comparing the output of the receiver channel to the output of the reference channel.

32. The method of claim 31, further comprising:
outputting the receiver channel output signal to a host system to provide data for sensing the input object in the sensing region of the input device.

33. The method of claim 29, wherein driving the transmitter signal is provided by a display processor, and driving of the transmitter signal is based on a communication signal provided by a sensor processor, said sensor processor coupled to the one or more receiver electrodes, wherein the method further comprises:
level shifting the communication signal, wherein level shifting comprises:
receiving the communication signal; and
adjusting the voltage level of the received communication signal to form an adjusted communication signal; and
delivering the adjusted communication signal to the display processor or a reference channel disposed in the sensor processor.

* * * * *